United States Patent
Zimmermann et al.

(12) 
(10) Patent No.: US 11,715,835 B2
(45) Date of Patent: Aug. 1, 2023

(54) INTERCONNECTOR PLATE FOR A FUEL CELL, AND FUEL CELL SYSTEM FOR AN AIRCRAFT

(71) Applicant: Airbus Defence and Space GmbH, Taufkirchen (DE)

(72) Inventors: Kristian Zimmermann, Taufkirchen (DE); Stephan Friedl, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 53 days.

(21) Appl. No.: 17/388,196

(22) Filed: Jul. 29, 2021

(65) Prior Publication Data
US 2022/0037678 A1 Feb. 3, 2022

(30) Foreign Application Priority Data
Jul. 29, 2020 (DE) ...................... 10 2020 120 035.8

(51) Int. Cl.
*H01M 8/0247* (2016.01)
*H01M 8/243* (2016.01)
*H01M 8/12* (2016.01)

(52) U.S. Cl.
CPC ......... *H01M 8/0247* (2013.01); *H01M 8/243* (2013.01); *H01M 2008/1293* (2013.01); *H01M 2250/20* (2013.01)

(58) Field of Classification Search
CPC ............................ H01M 8/0247; H01M 8/243
USPC ........................................................ 429/522
See application file for complete search history.

(56) References Cited

U.S. PATENT DOCUMENTS

| | | |
|---|---|---|
| 2004/0151975 A1 | 8/2004 | Allen |
| 2006/0234109 A1 | 10/2006 | Datta et al. |
| 2007/0224489 A1 | 9/2007 | Imura |
| 2008/0070082 A1 | 3/2008 | Norimatsu et al. |
| 2014/0093800 A1* | 4/2014 | Sato ................. H01M 8/04022 429/425 |
| 2014/0325991 A1 | 11/2014 | Liew et al. |
| 2017/0077541 A1* | 3/2017 | Togo ....................... H01M 8/16 |
| 2021/0091386 A1* | 3/2021 | Kee ..................... H01M 4/9083 |

(Continued)

FOREIGN PATENT DOCUMENTS

| | | |
|---|---|---|
| CN | 111 224 143 A | 6/2020 |
| DE | 11 2006 000 121 B4 | 2/2013 |
| EP | 2 654 115 A1 | 10/2013 |

(Continued)

OTHER PUBLICATIONS

German Search Report for Application No. 102020120033.1 dated May 4, 2021.

(Continued)

*Primary Examiner* — James M Erwin
(74) *Attorney, Agent, or Firm* — KDW Firm PLLC

(57) ABSTRACT

An interconnector plate for a fuel cell and a fuel cell system for an aircraft. For better extraction of the energy generated by the fuel cell, an interconnector plate can be attached by form fit to fixing studs of the fuel cell by retaining eyes. The interconnector plate may additionally be secured using glass solder. In preparation for a higher power density, a fuel cell can be produced in ceramic by 3D-printing and has an improved power density because of its helical shape.

20 Claims, 24 Drawing Sheets

(56) References Cited

U.S. PATENT DOCUMENTS

2022/0037685 A1    2/2022    Zimmerman et al.

FOREIGN PATENT DOCUMENTS

| EP | 3 754 768 A1 | 12/2020 |
|---|---|---|
| JP | 2002 151106 A | 5/2002 |
| JP | 2006 100091 A | 4/2006 |
| JP | 2008 159344 A | 7/2008 |
| WO | WO 98/35398 A1 | 8/1998 |
| WO | WO 2004/059771 A2 | 7/2004 |
| WO | WO 2019/074538 A1 | 4/2019 |

OTHER PUBLICATIONS

German Search Report for Application No. 102020120035.8 dated May 10, 2021.
Non-Final Office Action for U.S. Appl. No. 17/388,177 dated Aug. 8, 2022.
German Search Report for Application No. 102020124145.3 dated Jun. 17, 2021.
European Search Report for Application No. 21182358 dated Dec. 9, 2021.
European Search Report for Application No. 21182359 dated Dec. 10, 2021.
European Search Report for Application No. 21182360 dated Dec. 13, 2021.

\* cited by examiner

INTERCONNECTOR PLATE FOR A FUEL CELL, AND FUEL CELL SYSTEM FOR AN AIRCRAFT

CROSS-REFERENCE TO RELATED APPLICATION

This application claims priority to German Patent Application DE 10 2020 120 035.8 filed Jul. 29, 2020, the entire disclosure of which is incorporated by reference herein.

TECHNICAL FIELD

The disclosure herein concerns an interconnector plate for a fuel cell. The disclosure herein furthermore concerns a fuel cell system for an aircraft, and an aircraft.

BACKGROUND

Alternative drive concepts and energy sources are becoming increasingly important not only in individual transport but also in aviation. One concept is electric drives, or generally the generation of electrical energy in an aircraft. With respect to aviation, a high power density, ease of maintenance and high scalability are important. One candidate for providing the necessary energies are fuel cells, in particular solid oxide fuel cells.

SUMMARY

It is an object of the disclosure herein to improve fuel cells for use in aviation. This object is achieved by the subject matter disclosed herein.

The disclosure herein creates a fuel cell, preferably a solid oxide fuel cell, for a fuel cell system, preferably of an aircraft, wherein the fuel cell comprises a plurality of fuel cell regions arranged along a structural axis, wherein each fuel cell region has a gas channel which is configured running in the peripheral direction around the structural axis.

It is preferred that a first fuel cell region with a first gas channel for fuel and a second fuel cell region with a second gas channel for oxidator are provided.

It is preferred that the fuel cell regions are configured integrally as an individual one-piece element.

It is preferred that the fuel cell regions have a substantially hexagonal form in top view.

It is preferred that a plurality of first and second fuel cell regions are arranged alternately along the structural axis such that the first gas channels and second gas channels are fluidically connected.

It is preferred that each gas channel has at least one gas inlet region and at least one gas outlet region, each of which are arranged such that on arrangement/formation of a further fuel cell region offset along the structural axis, the gas outlet region aligns with and/or is fluidically connected to the gas inlet region of the further fuel cell region.

It is preferred that the gas inlet region and/or the gas outlet region is/are arranged on opposite ends of the gas channel.

It is preferred that an ion-conductive separating layer is arranged on one of the gas channels or between the gas channels in order to connect the gas channels together ion-conductively.

It is preferred that the fuel cell has at least one distribution pipe which is configured for supplying fuel and/or oxidator to the respective gas channel or for discharging reaction product or unused gas from the respective gas channel, wherein the distribution pipe—viewed along the structural axis—is at least partially surrounded by each gas channel.

It is preferred that the fuel cell comprises a plurality of part portions, wherein the gas channels in the respective part portions can be supplied with fuel and oxidator in parallel.

It is preferred that, viewed in their extension direction, the gas channels enclose an angle, preferably an angle between 30° and 60°, with a plane orthogonal to the structural axis.

It is preferred that the gas channels form a double helix.

It is preferred that each gas channel has a gas channel curvature region and an adjoining gas channel planar region.

It is preferred that the gas channel curvature region is curved by 120° or 180°.

It is preferred that a gas inlet region and/or a gas outlet region is/are arranged on the gas channel planar region, preferably in the middle of the gas channel planar region.

It is preferred that each gas channel has a gas supply region which is connected to the respective distribution pipe.

It is preferred that each distribution pipe is arranged inside a region surrounded by the gas channel curvature regions and the gas channel planar regions.

It is preferred that the fuel cell has a plurality of interconnector plates which are configured for extracting the electrical energy.

It is preferred that each gas channel contains a conductive electrode coating for the generated electrical energy.

It is preferred that each interconnector plate has at least one contact tongue which protrudes into the corresponding first gas channel or second gas channel.

It is preferred that the gas channel comprises at least one opening for the contact tongue.

It is preferred that several contact tongues are arranged in comb-like fashion.

It is preferred that each interconnector plate comprises only a single contact tongue.

It is preferred that each interconnector plate has an electrical connecting region adjoining the contact tongue.

It is preferred that the connecting region is configured such that, in the installed state of the interconnector plate, it is turned radially outward so that it can be received by a conductive element.

It is preferred that each interconnector plate has a clamping region which extends substantially parallel to and at a distance from the contact tongue in order to retain the interconnector plate on the fuel cell.

It is preferred that the interconnector plate is embedded in the electrode coating.

It is preferred that the interconnector plate has a similar expansion coefficient to that of the gas channel into which it protrudes, in order to prevent a delamination of the interconnector plate.

It is preferred that the interconnector plate has a connecting region for picking up the electrical energy, wherein the connecting region is configured such that interconnector plates stacked along the structural direction can be connected together by a rod, preferably a threaded rod.

It is preferred that the interconnector plate has at least one retaining eye by which the interconnector plate can be retained on the fuel cell by form fit, preferably by attachment to a stud.

It is preferred that the retaining eye has a circular or D-shaped form.

It is preferred that each gas channel has a rectangular cross-section.

It is preferred that each fuel cell region has a retaining device for retaining an interconnector plate.

It is preferred that the retaining device comprises at least one fixing stud for form-fit attachment of the interconnector plate.

It is preferred that fixing studs are arranged on each fuel cell region.

It is preferred that the fixing studs are configured in the form of a hemisphere, quarter sphere or hook.

It is preferred that the interconnector plate comprises a strip-like region which, in the installed state, closely follows the contour of the fuel cell region.

It is preferred that on its outer peripheral face, the fuel cell has a winding structure for a conductive element, for example a wire.

It is preferred that the winding structure is configured in helical form. The winding structure preferably comprises a groove. The groove preferably runs such that interconnector plates of the same polarity can be connected together electrically by winding a conductive element around the winding structure.

The disclosure herein creates a fuel cell system for an aircraft, comprising a plurality of preferred fuel cells which are arranged spaced apart from one another in a plane and/or stacked along their structural axis.

Preferably, the fuel cell system comprises a fuel tank and/or a heating device, wherein the fuel cells are connected fluid-conductively to the fuel tank and heat-conductively to the heating device.

Preferably, the fuel cell system comprises an electrical energy storage device which is configured for temporary storage of electrical energy generated by the fuel cell, and/or an oxidator tank which is fluid-conductively connected to the fuel cell.

The disclosure herein furthermore creates an aircraft comprising a preferred fuel cell and/or a preferred fuel cell system.

The disclosure herein creates an interconnector plate for a fuel cell, wherein the interconnector plate comprises at least one contact tongue which can be inserted in a gas channel, a connecting region which is configured for picking up the electrical energy, and at least one retaining eye, by which the interconnector plate can be retained by form fit on the fuel cell by attachment to a stud, and/or has at least one clamping region by which the interconnector plate can be retained by insertion in an opening of the fuel cell.

It is preferred that the interconnector plate is configured as a bent sheet metal part.

It is preferred that several contact tongues are arranged in comb-like fashion.

It is preferred that the interconnector plate has an expansion coefficient similar to that of the gas channel in which it can be inserted, in order to prevent a delamination of the interconnector plate.

It is preferred that the connecting region is configured such that interconnector plates arranged along a structural direction can be connected together by a rod, preferably a threaded rod.

It is preferred that the retaining eye has a circular or D-shaped form.

It is preferred that the interconnector plate comprises a strip-like region which, in the installed state, closely follows the contour of a fuel cell region.

The disclosure herein creates a fuel cell region for forming a fuel cell, wherein the fuel cell region is configured for retaining an interconnector plate by at least one fixing stud which can hold the interconnector plate by form fit.

It is preferred that the fixing stud is configured as a hemisphere, quarter sphere or hook.

It is preferred that the fuel cell region has a contact face for a strip-like region of an interconnector plate so that the strip-like region in the installed state closely follows the contour of the interconnector plate.

The disclosure herein creates a fuel cell, preferably a solid oxide fuel cell, for a fuel cell system, preferably of an aircraft, wherein the fuel cell comprises a fuel cell region as described above and an interconnector plate as described above, wherein the interconnector plate is retained on the fixing stud by the retaining eye.

The disclosure herein creates a method for manufacturing an interconnector plate for a fuel cell region, with the steps:
a) providing a flat metal sheet;
b) cutting out a flat interconnector plate blank to form at least one contact tongue, at least one connecting region and at least one retaining eye; and
c) bending the interconnector plate blank into a three-dimensional form which corresponds to the contour of the fuel cell region such that in the installed state, the interconnector plate closely follows the contour of the fuel cell region.

The disclosure herein creates a method for manufacturing a fuel cell by producing an interconnector plate, inserting the contact tongue of the interconnector plate in a gas channel of the fuel cell and attaching the interconnector plate to the gas channel wall.

Preferably, the method comprises subsequent coating of the gas channel wall with an electrode coating, so that the contact tongue is embedded in the electrode coating.

A helical design allows a larger membrane area, a smaller proportion of passive structures, and a better scalable design.

Instead of a round cross-section, the helices may also have a flat cross-section without adversely affecting the function of the fuel cell. The channels preferably comprise flat, uncurved part portions on the long side. In particular, in these regions the wall pieces of the channels form planes. This allows simplified integration of metallic interconnectors, in particular if the contact faces have no curvature.

Furthermore, fuel cell regions with an elongate base form may advantageously be combined into larger systems. In this way, the installation space may be utilized particularly efficiently and almost completely. As a whole, high volumetric power densities (Watt/liter) can thus be achieved.

The circulating gas channels need not be configured flat. The channels may instead be arranged obliquely without adversely affecting their function. At the same time, the membrane area can be enlarged for the same base element cross-section. Thus an increased power (Watt) of the fuel cell element may be achieved.

Furthermore, the fuel cell regions may be produced by 3-D printing processes for ceramics. There are technical restrictions for geometries. Without so-called supporting structures, usually it is not possible to print a flat face parallel to the base face. However, up to a specific angle, it is possible to print overhangs (stair principle). The oblique arrangement of the helical channels allows the design to be printed more easily.

Each fuel cell requires a supply of combustion gases and the discharge of the reaction product. In high-temperature fuel cells, the air channel may additionally be used for cooling the cell. Thus two supply channels and two discharge channels per cell unit may be used. These are known as manifolds or distribution pipes and serve as gas connections of the element. The distribution pipes may be integrated in the middle of the helical design. Advantageously, the connecting pieces may thus also be printed directly in the 3-D printing process. No further components are required.

Also, by using the inner region of the helices for the supply and discharge of gas, a compact structure can be achieved. Accordingly, the power density can be improved, above all in comparison with structures requiring additional elements.

The central gas supply to the printed manifolds creates the possibility of supply and discharge of the gases in several levels. Thus the design can be scaled beyond the gas depletion in the channels. Normally, the channel length is limited since the fresh gases are consumed while the reaction product is enriched. Above a specific channel length, an effective operation of the cell is difficult since a longer channel can no longer contribute substantially to further conversion of the gases. This can be avoided if several parallel-connected helical elements are connected to the supply and discharge channels. The length of the fuel cell element in a helical design is thus theoretically unlimited, since every part portion can be supplied with fresh gases. Also, gas discharge is possible in the same fashion. Thus larger individual cells can be produced, which is advantageous in particular for systems with high power levels.

If the coatings of the membranes are broken down into part portions and electrically conducted individually out of the helices, a separate electrical cell voltage potential may apply for each part portion. This allows series connection as in conventional stacks. Thus a stack can be created which can be produced in 3-D printing processes, which can be manufactured in one piece and which requires no additional seals between the membrane portions. Thus the weight of the unit and the proportion of the structure actively contributing to energy conversion can be reduced.

Furthermore, the design is advantageous for the attachment of metallic interconnectors for the extraction of electrical energy.

The electrode coatings, which usually form the anode and cathode of the fuel cell regions, often have a limited conductivity. In particular, the cathode material has a very low conductivity in comparison with metals. The charge carriers, which are split or recombined on the surfaces, must be transported between the electrodes in order to close the circuit. The load or energy consumer is integrated in this circuit. Since the current flow takes place in the plane of the thin electrode coating and the effective conductor cross-section of the electrodes is comparatively low because of the small layer thicknesses of usually 50 μm to 400 μm, significant ohmic losses may occur here. To increase the efficiency of the fuel cell operation, these losses should be minimized as far as possible. Normally, metallic lattices are applied to the electrode coating, for example nickel braid.

Solid oxide fuel cells (SOFC) with internal membrane structures produced by 3-D printing are not easily accessible from the outside. Only electrode coatings can be applied to the internal structures. This may take place for example by powder coating with small particles. Solid metallic structures have not previously been printable. As a solution, a metallic interconnector structure is proposed which can be combined with the ceramic base body for electrode contacting.

The typical operating temperatures of high-temperature fuel cells are up to 1000° C. This constitutes a challenge for the materials but also for the construction and connection technology. Seals can be produced with glass solder. It is possible but difficult to create an operationally resistant connection between metallic interconnectors and filigree ceramic structures. Also, no conventional adhesives are available for the typical temperatures. Screw fittings for porous materials can also be complicated and, in addition, undesirably increase the weight. Force-fit connections using spring forces, such as snap-fit or clip connections, are also difficult to implement since the spring constants may be too low at the operating temperatures of the SOFC.

One idea therefore is to attach bent metallic parts to the fuel cell by form-fit connection and seal these with glass solder. The use of metal alloys matched to the expansion coefficients of the ceramic base material can avoid additional stress forces. For example, the material Crofer-22-APU, available from VDM as a plate material, may be used.

For a form-fit connection, structures on the ceramic body are proposed which allow attachment of the metallic elements. Modern 3-D printing processes however have restrictions in this respect, so that the form should be selected accordingly. Spherical surfaces for example are easily possible in all lengths. Therefore preferably semicircular "studs" are used with which metal strips can be positioned. This principle may be extended in that it is possible to engage the plate by hooks in the tension direction. For this, the hemispherical structure may be divided again. The retaining force may be further increased by chamfering. As a whole, the sheet metal parts proposed as interconnectors may be self-retaining so as to facilitate assembly of the fuel cell.

The maximum current flow produced by the cell depends inter alia on the membrane area. Since the conductivity in the electrode layers is limited, the metallic contacting is preferably repeated at certain intervals. This can be ensured by a comb-like base structure in which the pattern repeats are in principle unlimited, and hence the dimensions of the target design are unlimited.

Furthermore, the comb-like structure may allow a certain compensation for movement. This can help dissipate material stresses and avoid a delamination between the metallic interconnector and the ceramic with electrode coating. Thus even small differences between the expansion coefficients of the materials can be compensated.

The electrical connection between the interconnector metal and the electrode may be created in that firstly the plates are connected to the ceramic and then coated with the electrode. The contact tongues are thus embedded directly in the electrode material and hence also connected to the ceramic base material.

Large numbers of interconnectors are required, and these should be designed so that a manufacturing method is suitable for mass production. The plates can be cut out of sheets by various production methods, such as for example micro-waterjet cutting, punching or laser jet cutting. Additional forming with bending devices is also possible. The number and length of the contact tongues required for the function does not conflict with the ease of production because of the special design. Also no further process is required for assembling the plate parts from several components. The interconnector plate can be produced as a unit.

The plate interconnectors are particularly suitable for the high-temperature fuel cell described herein, but may also be used for other similar architectures.

The pitch of the helices in the cut plate can be taken into account so as to give a horizontal connection which can easily be joined to further connections. An electrically conductive threaded rod is conceivable here. The plate elements may be attached to the ceramic body one by one and hence allow separate contacting of the positive and negative potential. The contact tongues preferably protrude through openings in the ceramic directly over the active membrane faces. The electrode materials may be applied subsequently.

The remaining openings can be closed with glass solder as usual in high-temperature fuel cells. In addition, preproduced glass films with a corresponding hole pattern may be applied before the plate parts are arranged on the ceramic. This allows an improved seal and additionally "bonds" the plate parts to the electrolyte. In the final production step, the glass parts may be melted in an oven in order to achieve the desired seal between the metal and ceramic. A further example has a hexagonal base structure. Because of the symmetrical design, a comparatively even shrinkage can be achieved in the sintering process. This makes the fuel cell body less susceptible to cracking and the production process as a whole is more stable. Also, these elements can be arranged spatially very compactly, whereby the achievable power density can be further improved.

The membrane faces thus still have flat part segments which can be contacted well with flat plate parts. The proportion of curved faces falls further in comparison with other designs. As a result, the usable membrane area may be further enlarged proportionally.

The gas supply may take place in a segmented stack. This may in a simple fashion improve the gas supply in elements arranged in adjacent rows.

The casing surface of the fuel cell preferably has a peripheral groove in which a wire can be laid. The groove, like a screw thread, is continuously worked into the casing surface. A wire may be wound along this groove for contacting the interconnector plates around the cell. This wire may fix the plates and/or be used as an electrical diverter.

Again, simple bent sheet metal parts, which are inserted through openings in the fuel cell structure, may be used as interconnector plates. In a further step, the wire may be arranged. The wire may be connected to the plates locally by suitable welding processes (e.g., TIG or microplasma welding). The remaining openings may be sealed by glass solder.

This procedure gives a form-fit construction of a fuel cell and interconnector plates. The temperature-stable, substance-bonded connection of the interconnectors and diverter wire can allow a high stability and good efficiency.

BRIEF DESCRIPTION OF THE DRAWINGS

Example embodiments of the disclosure herein are described in more detail below with reference to the appended schematic drawings. In the drawings.

DETAILED DESCRIPTION

Figure 1:
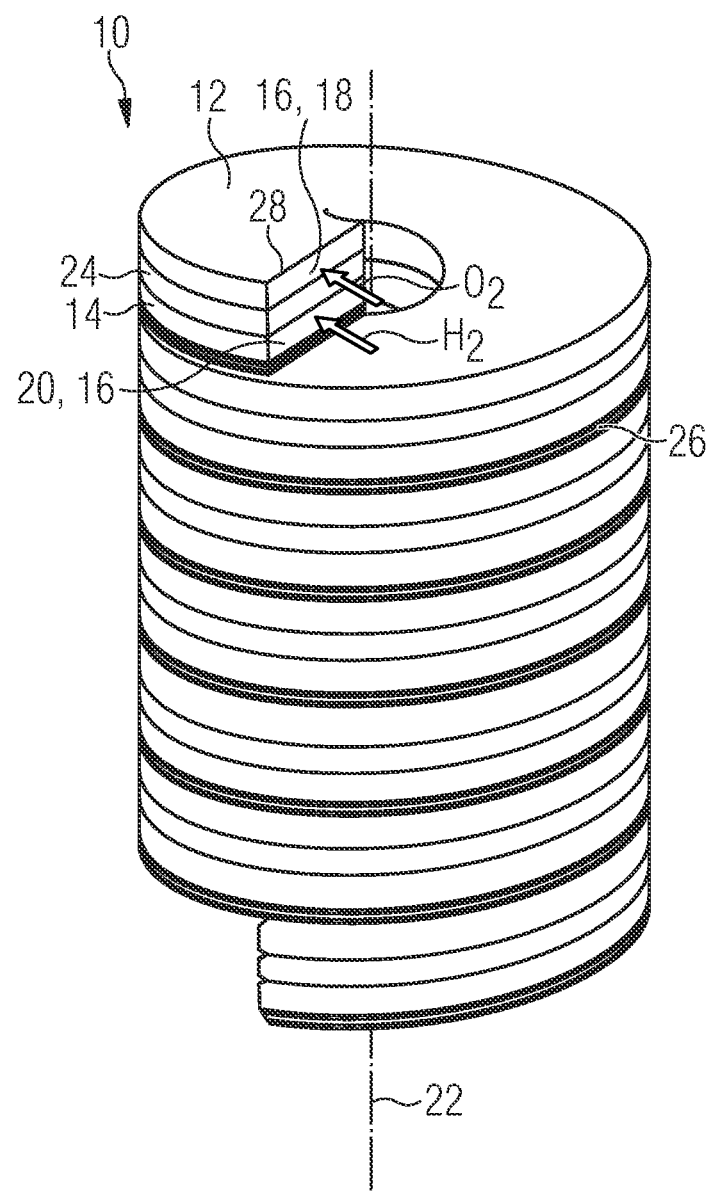
FIG. 1 shows an example of a helical fuel cell.

Reference is firstly made to FIG. 1 which shows an example of a fuel cell 10. The fuel cell 10 has a first fuel cell region 12 and a second fuel cell region 14. Each fuel cell region 12, 14 contains a gas channel 16.

The first fuel cell region 12 comprises a first gas channel 18, for example for an oxidator, and the second fuel cell region 14 comprises a second gas channel 20, for example for fuel.

The first gas channel 18 and the second gas channel 20 extend in a helix in a peripheral direction around a structural axis 22. The structural axis 22 here runs in the center of the helix.

The first gas channel 18 and the second gas channel 20 are connected together along their extension direction by an ion-conductive separating layer 24. Furthermore, an isolating layer 26 is provided to prevent cell conclusion.

Each gas channel 16 may contain an electrode coating 28 for extracting the generated electrical energy from the fuel cell 10.

Figure 2:
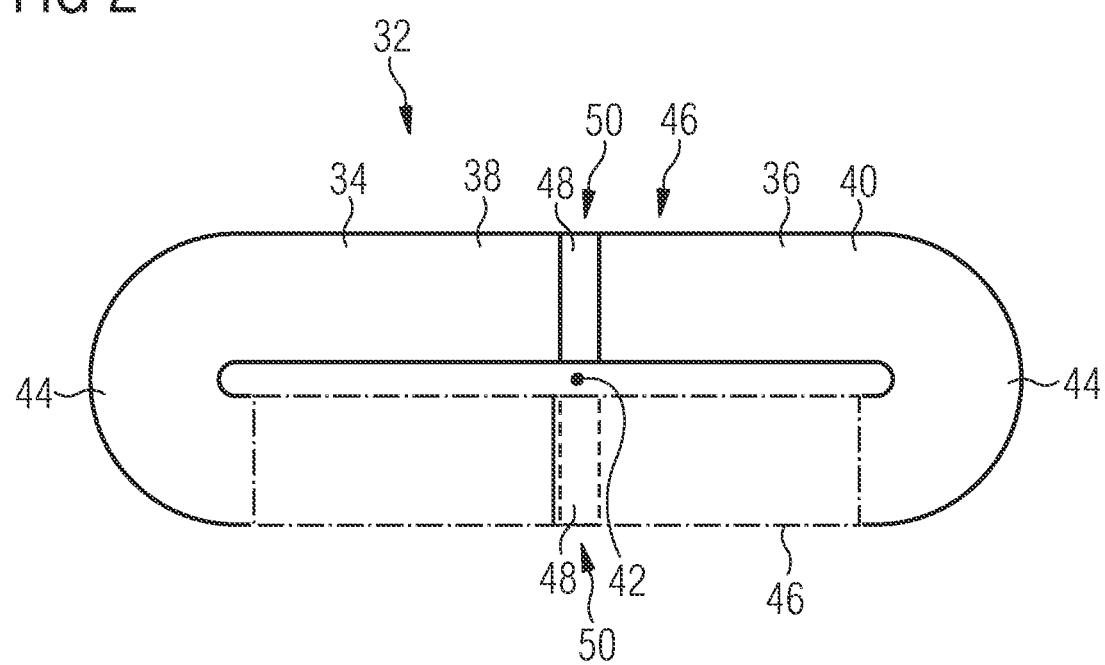
FIG. 2 shows an example of flat fuel cell region.
Figure 3:
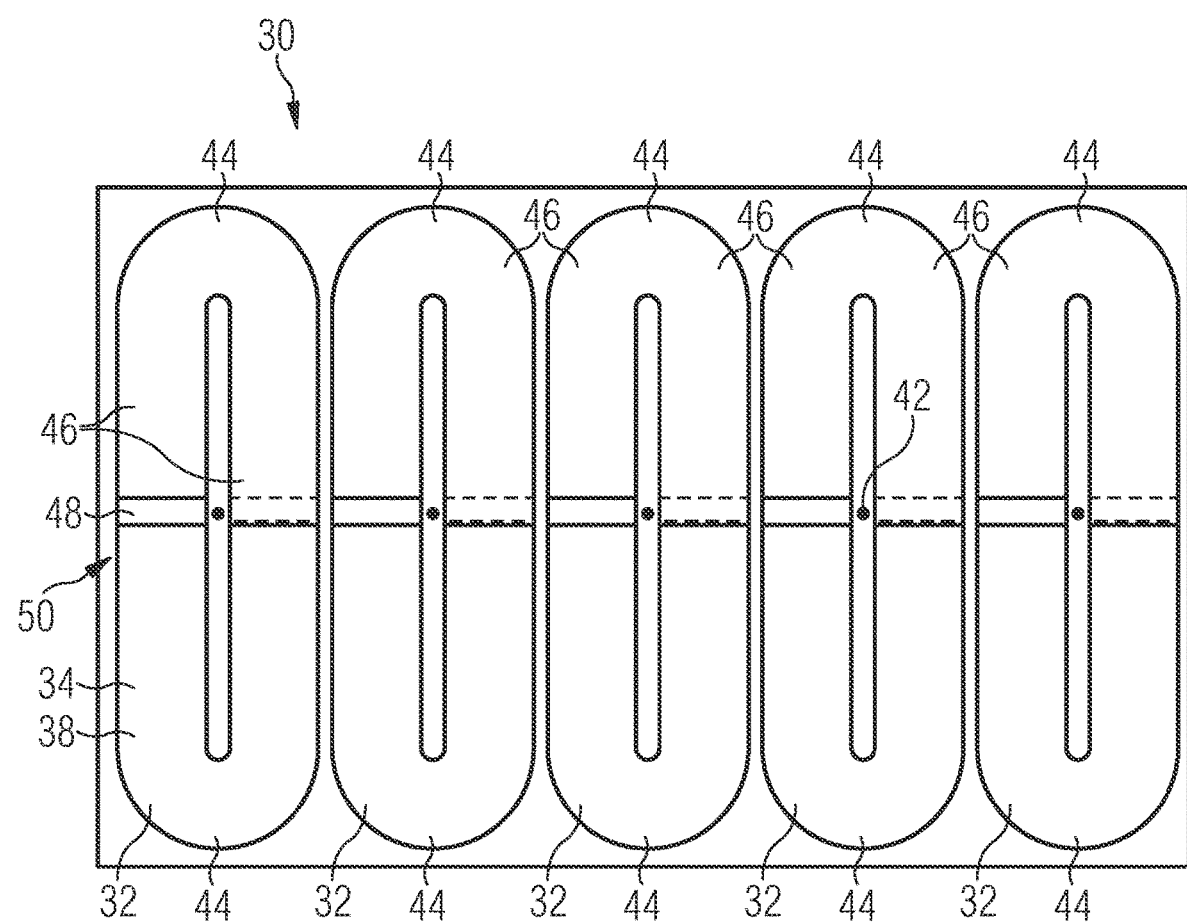
FIG. 3 shows a plurality of fuel cell regions.
Figure 4:
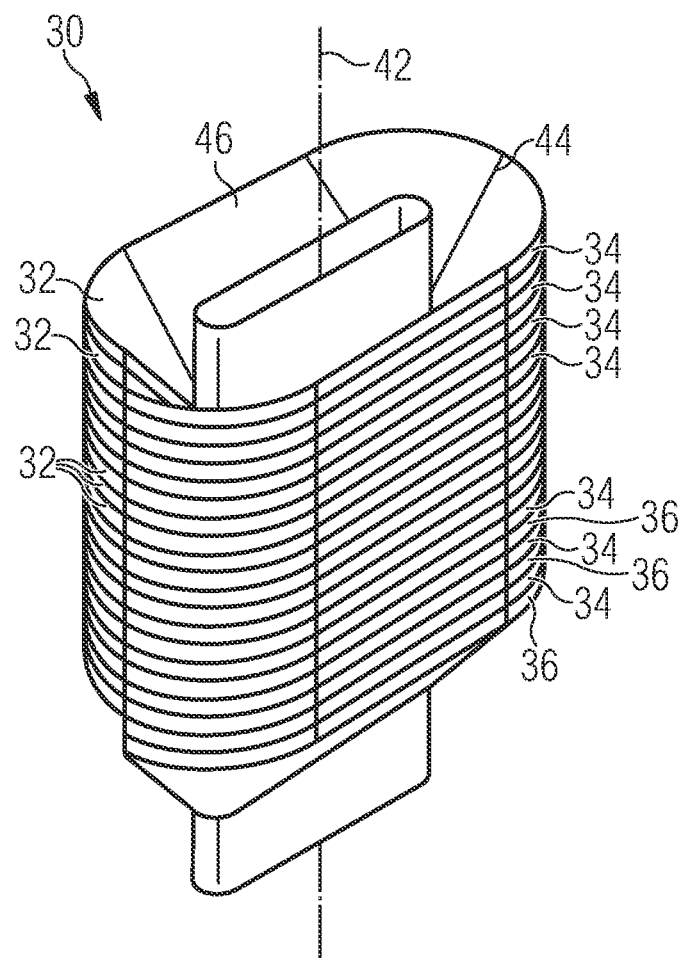
FIG. 4 shows an example of a fuel cell comprising the fuel cell regions in FIG. 2.

Reference is made to FIG. 2 through FIG. 4 which show an example of a fuel cell 30. The fuel cell 30 comprises a plurality of fuel cell regions 32. A first fuel cell region 34 and a second fuel cell region 36 may be formed as one piece.

Each fuel cell region 32 comprises a first gas channel 38 and a second gas channel 40. The fuel cell region 32 is configured such that the gas channels 38, 40 run in the peripheral direction around a structural axis 42. The structural axis 42 runs perpendicular to the drawing plane in FIGS. 2 and 3.

Each gas channel 38, 40 has a gas channel curvature region 44 and an adjoining gas channel planar region 46. The gas channel curvature region 44 is preferably curved through 180°. The gas channel planar region 46 is straight with no curvature, giving an elongated oval form of the fuel cell region 32.

The first gas channel 38 and the second gas channel 40 each have a gas inlet region 48. The gas inlet region 48 is evident in the top view of FIGS. 2 and 3 but is not shown in detail in FIG. 4. In FIG. 4, the gas inlet region 48 is oriented upward. The gas inlet region 48 is arranged for example in the middle of the gas channel planar region 46. The gas inlet region 48 is preferably arranged such that, e.g. on arrangement of a further fuel cell region 32 along the structural axis 42, the gas inlet region 48 is fluidically connected to the respective gas channel 38, 40 of the further fuel cell region 32.

The first gas channel 38 and the second gas channel 40 each have a gas outlet region 50. The gas outlet region 50 is below the drawing plane in the top view of FIGS. 2 and 3 and therefore not visible. In FIG. 4, the gas outlet region 50 is oriented downward. The gas outlet region 50 is arranged for example in the middle of the gas channel planar region 46. The gas outlet region 50 is preferably arranged such that, e.g. on arrangement of a further fuel cell region 32 along the structural axis 42, the gas inlet region 48 is fluidically connected to the gas outlet region 50 of the respective gas channel 38, 40 of the further fuel cell region 32.

Each gas channel 38, 40 may contain an electrode coating 52 in order to extract the generated electrical energy from the fuel cell 30.

As a whole, thus a continuous first gas channel 38 and second gas channel 40 may be formed. Thus the effective area is significantly enlarged and the volumetric power density may be increased.

Figure 5:
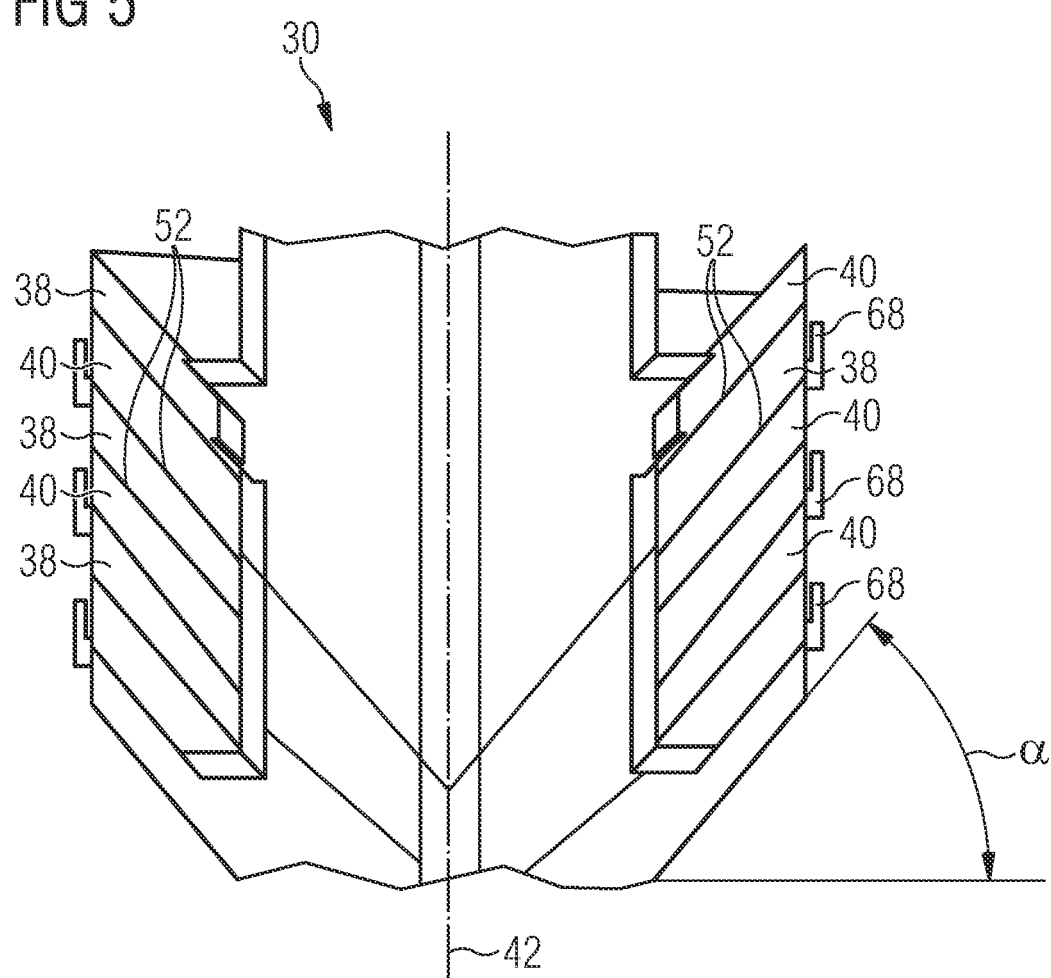
FIG. 5 shows a section through the fuel cell from FIG. 4.

As FIG. 5 shows, the gas channels 38, 40 may be formed at an angle α relative to the horizontal direction. With this design, production by 3-D printing may be simplified because fewer or no support structures are required.

Figure 6:
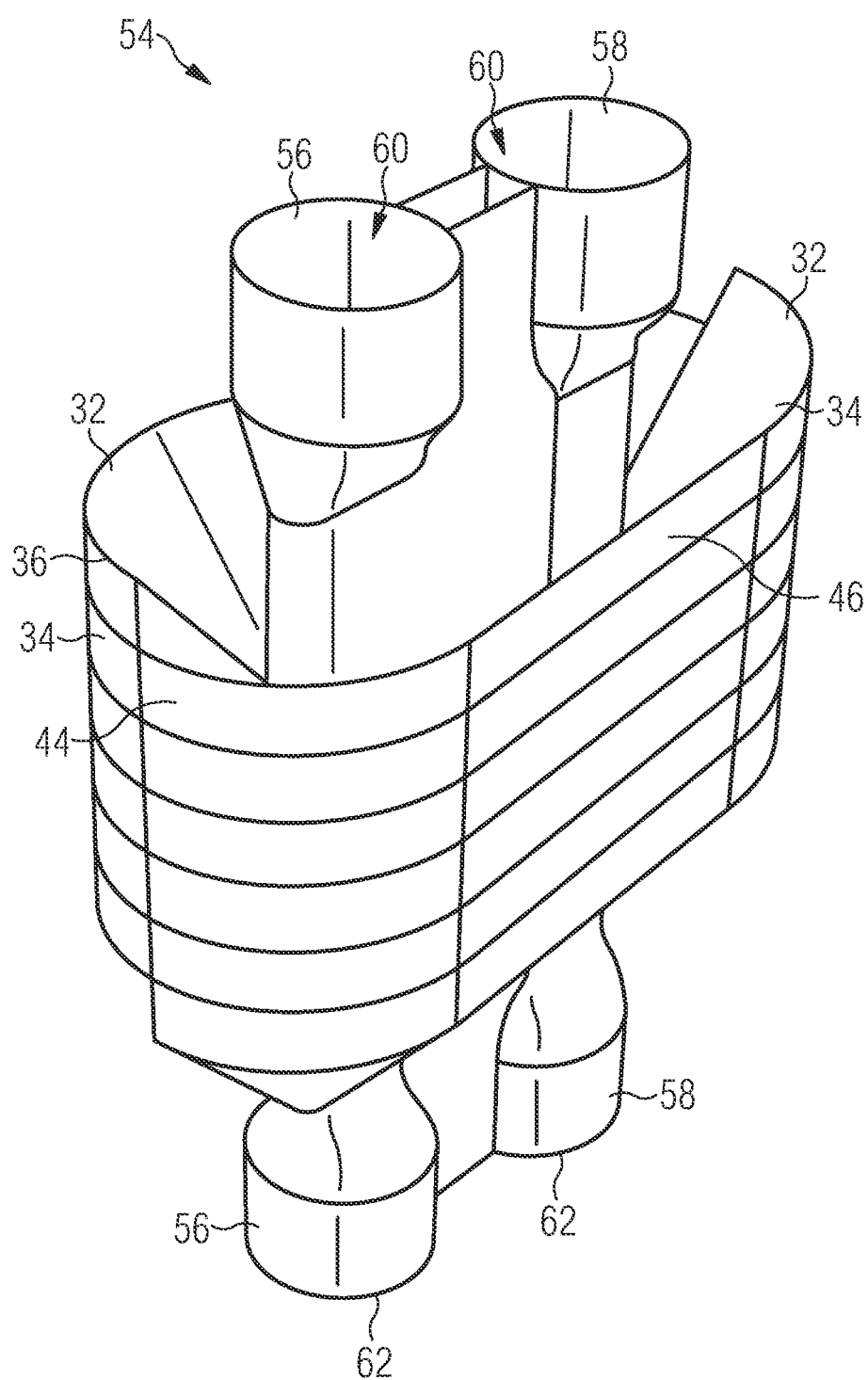
FIG. 6 shows a further example of a fuel cell.
Figure 7:
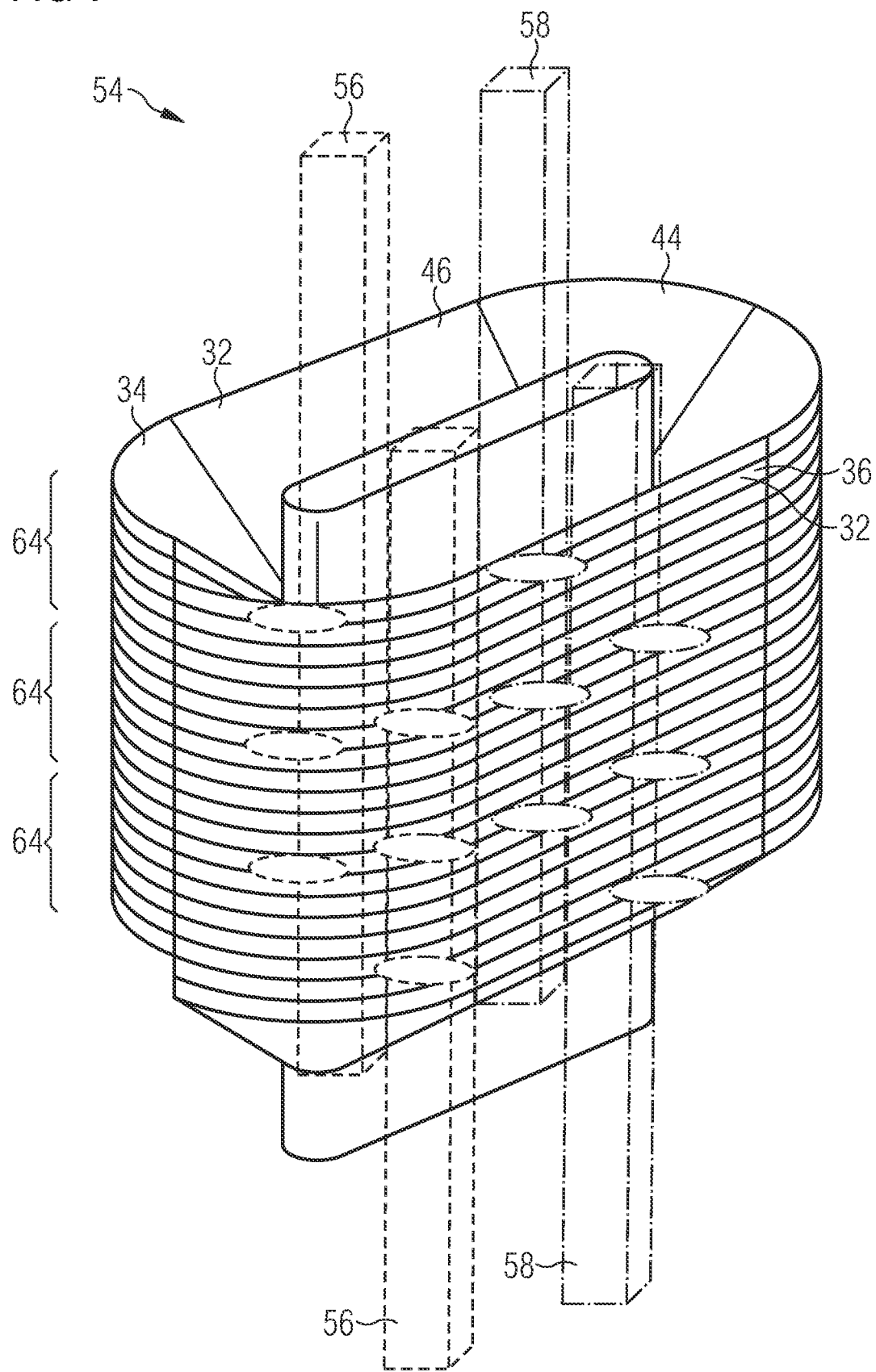
FIG. 7 is a schematic view of the gas supply to the fuel cell from FIG. 6.
Figure 8:
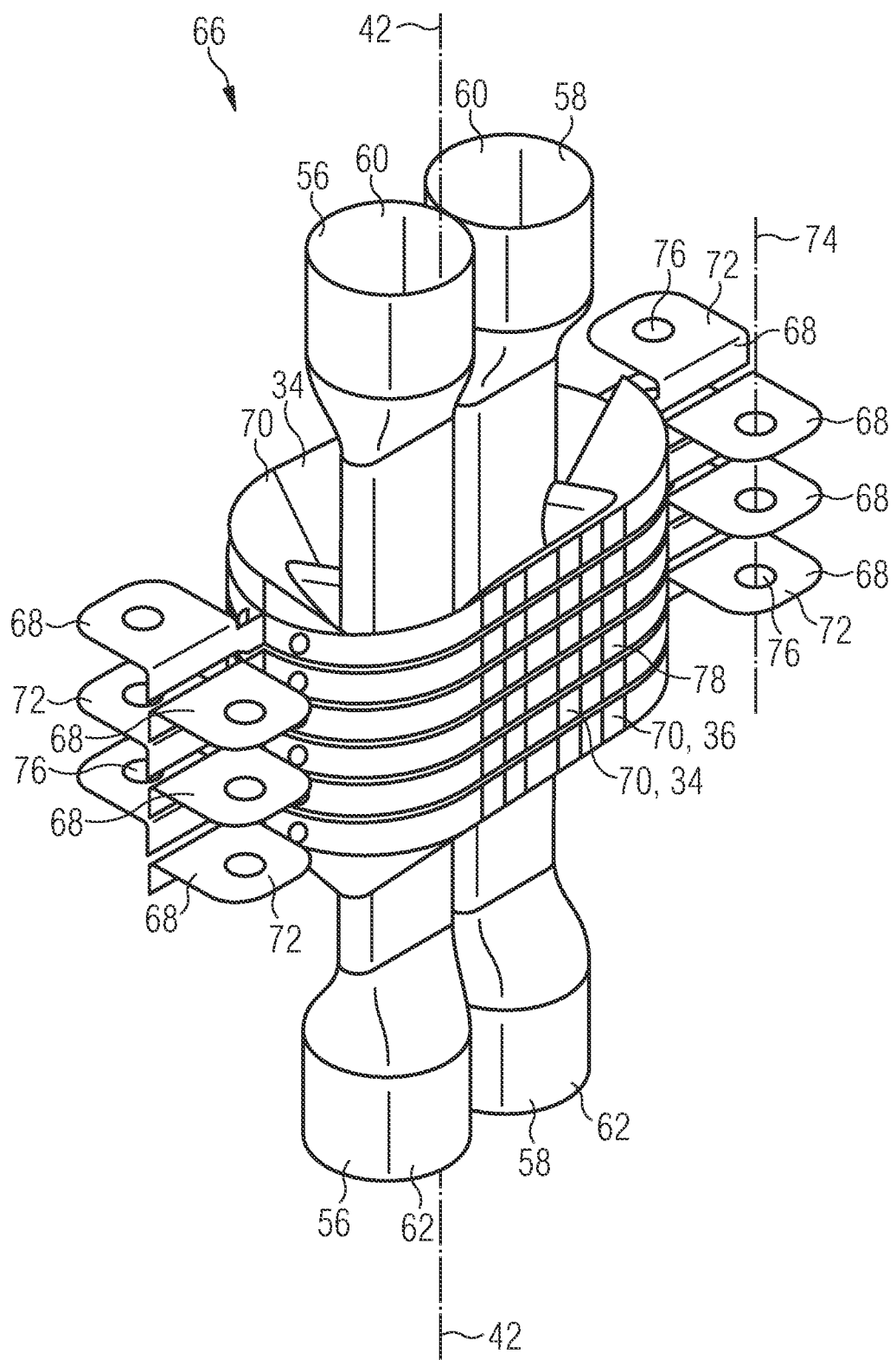
FIG. 8 through FIG. 12 show an example embodiment of a fuel cell with interconnector plates.
Figure 9:
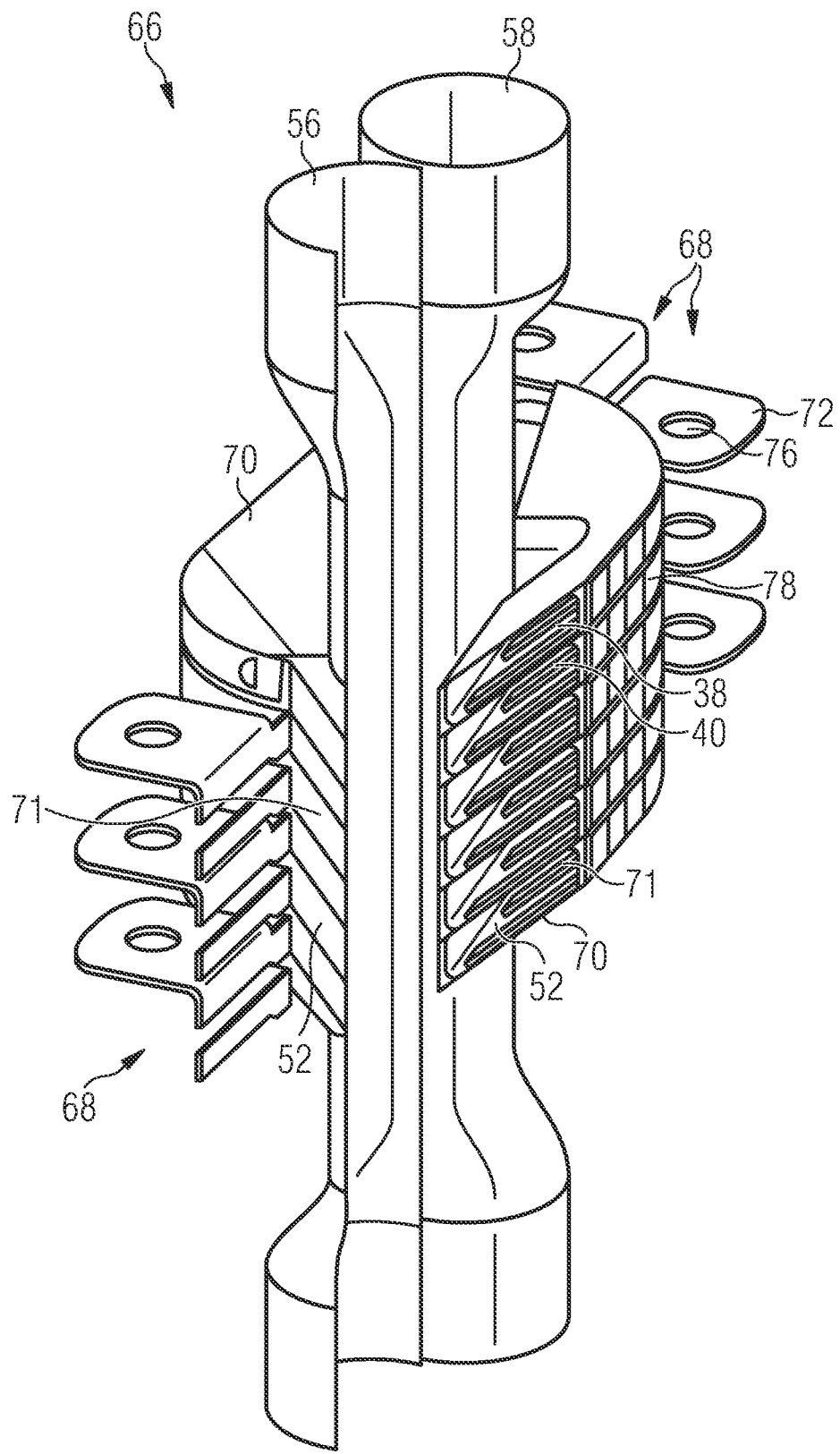
Figure 10:
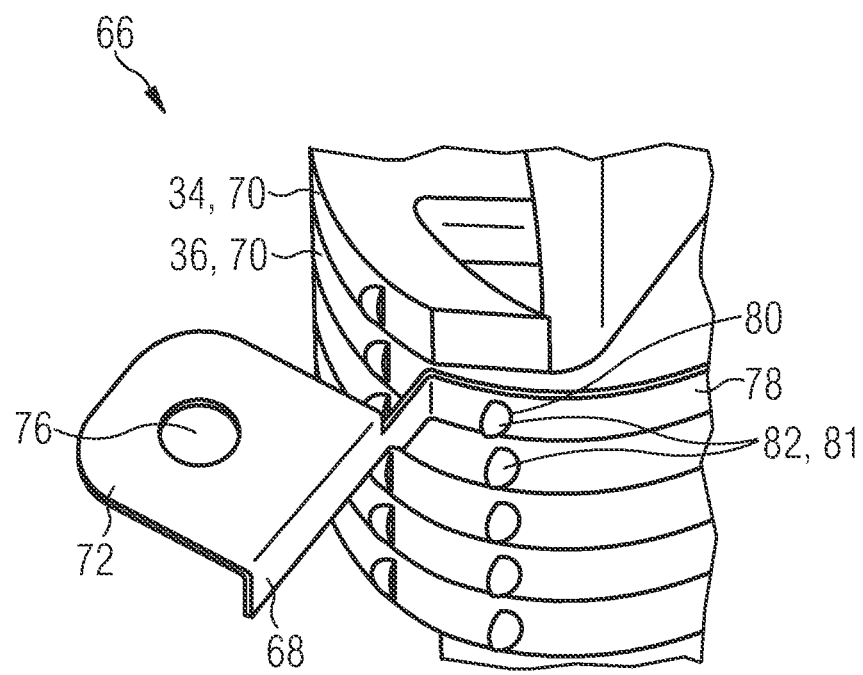
Figure 11:
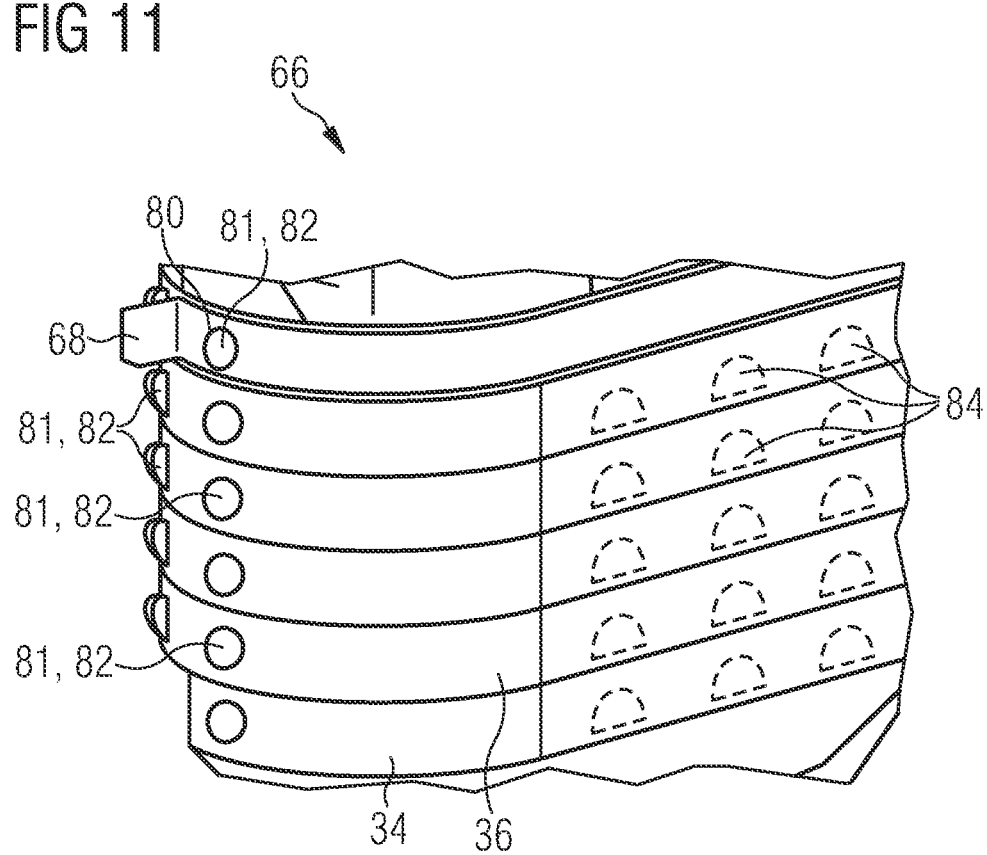
Figure 12:
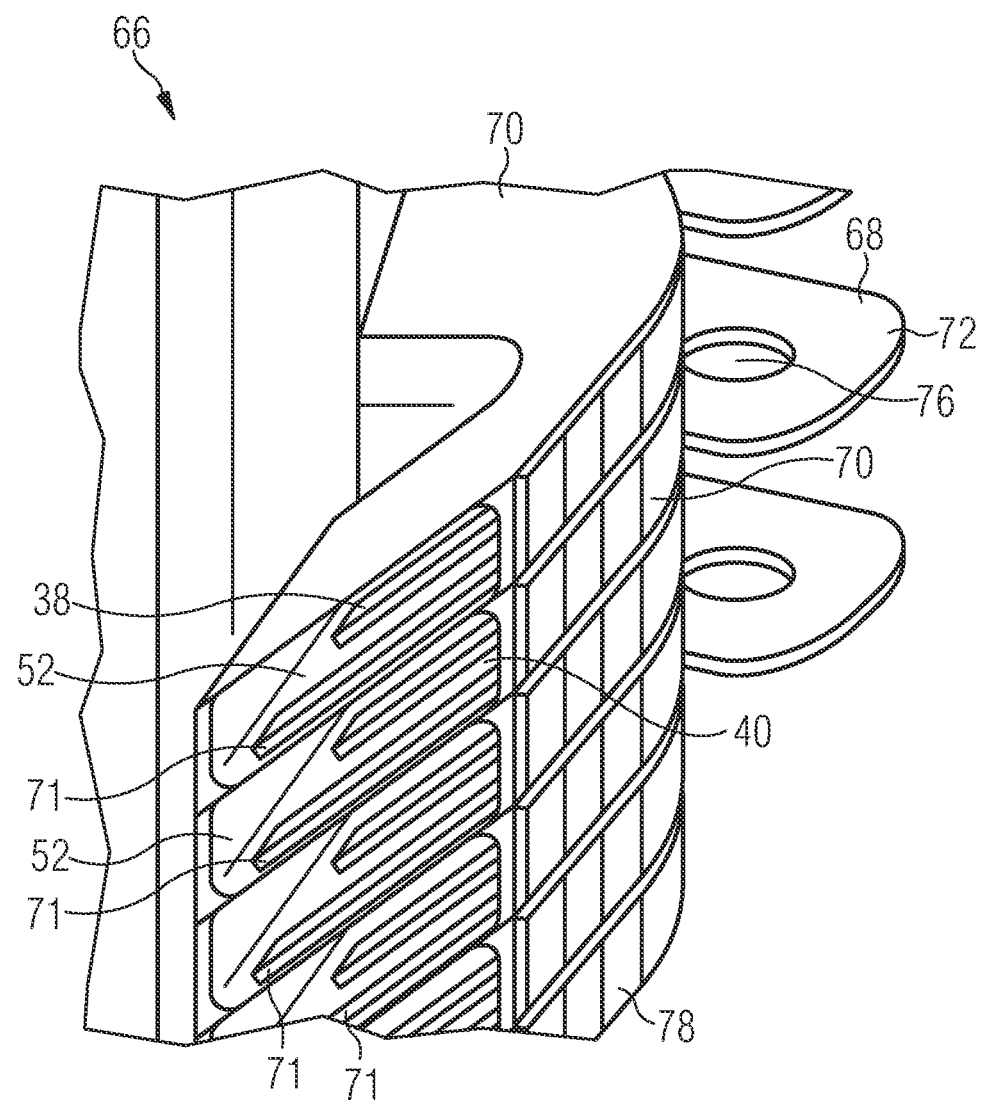
Figure 13:
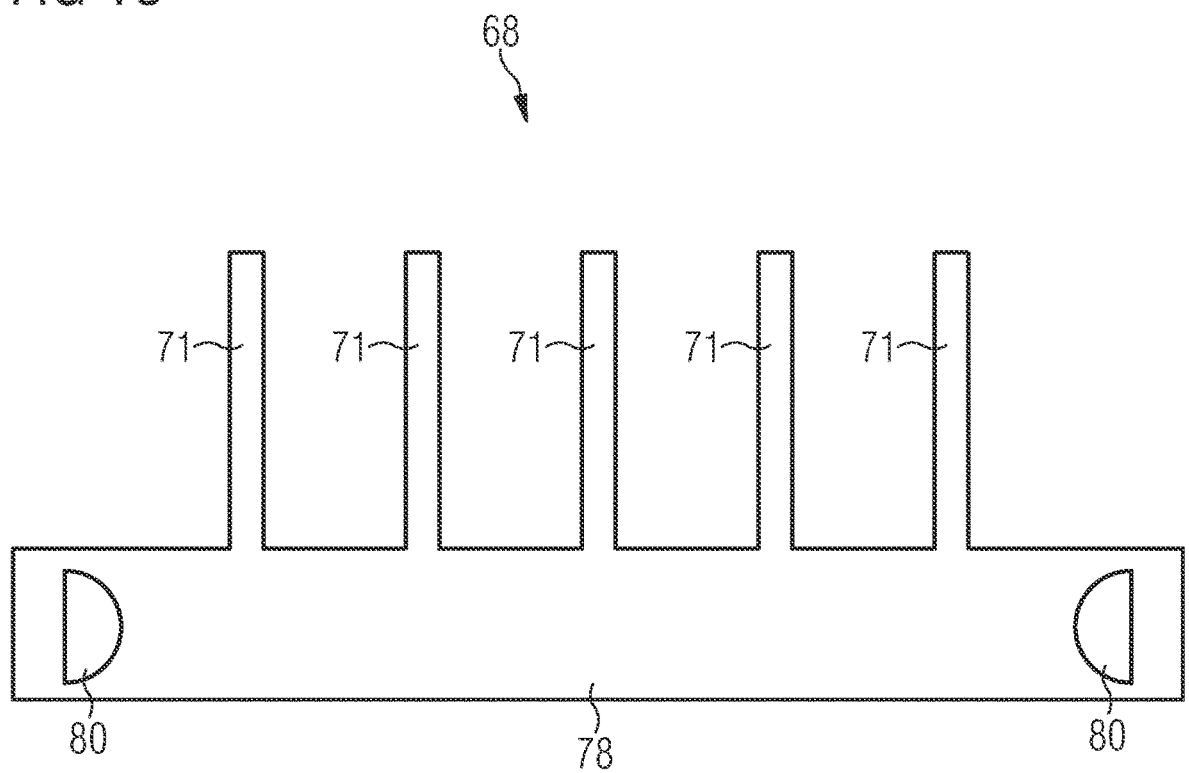
FIG. 13 shows an example of an interconnector plate.
Figure 14:
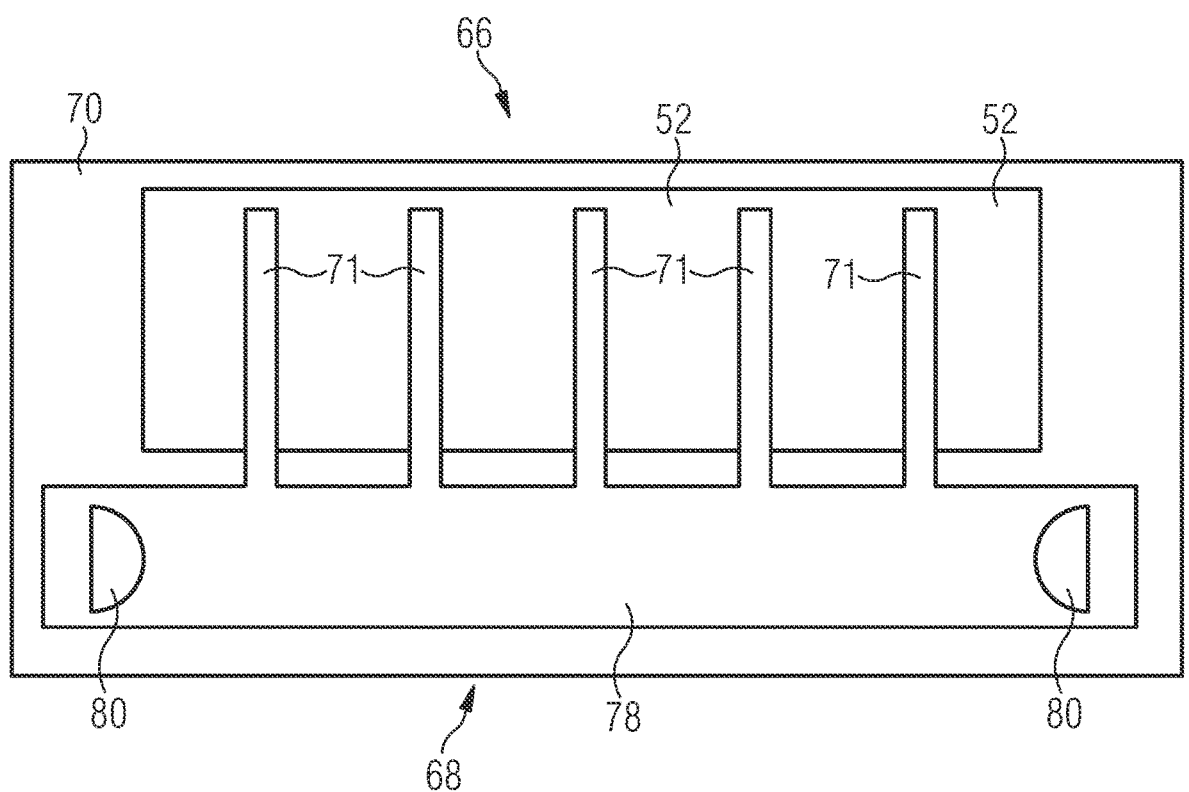
FIG. 14 shows the interconnector plate from FIG. 13 in the installed state.

Reference is made to FIG. 6 and FIG. 7 which show an example of a fuel cell 54 in different variants. The fuel cell 54 comprises a plurality of fuel cell regions 32, a first distribution pipe 56 and a second distribution pipe 58. The first distribution pipe 56 may be provided for the fuel, while the second distribution pipe 58 may be provided for the oxidator.

The distribution pipes 56, 58 are arranged in a region which is surrounded by the gas channels 38, 40, or enclosed when viewed in top view. The distribution pipes 56, 58 in the present case run parallel to the structural axis 42.

Each distribution pipe 56, 58 has a gas supply region 60 which may be configured so as to be connectable to a gas reservoir. In the case of the oxidator, the gas supply region 60 may serve for the air supply without a gas reservoir.

Each distribution pipe 56, 58 also has a gas discharge region 62 from which the unused residual gas and reaction product may escape.

In the variant shown in FIG. 6, the first distribution pipe 56 serves for distribution of the fuel, and the second distribution pipe 58 for distribution of the oxidator. In this variant, the first distribution pipe 56 with the first gas channel 38, and the second distribution pipe 58 with the second gas channel 40, form a respective continuous fluid path.

In the variant shown in FIG. 7, the fuel cell 54 is divided for example into three part portions 64. Each part portion 64 is supplied with fuel and oxidator through the distribution pipes 56, 58, independently of the other part portions 64.

Reference is made to FIGS. 8 through 14 which show an example of a fuel cell 66. The fuel cell 66 is configured similarly to the fuel cell 54 and also has a plurality of interconnector plates 68. Each interconnector plate 68 is arranged on a fuel cell region 70 of the fuel cell 64. The generated electrical energy can be extracted by the interconnector plates 68.

The interconnector plate 68 comprises a plurality of contact tongues 71. Each contact tongue 71 protrudes either into the first gas channel 38 or into the second gas channel 40. The contact tongues 71 are attached to the wall of the respective gas channel 38, 40. The electrode coating 52 is preferably arranged such that the contact tongues 71 are embedded in the electrode coating 52.

Each interconnector plate 68 furthermore comprises an electrical connecting region 72. The connecting regions 72 are configured such that they can be electrically connected along a connecting axis 74 by a threaded rod. Each connecting region 72 may have a connecting opening 76 for the threaded rod. In other words, the connecting openings 76 of the connecting regions 72 are aligned.

Each interconnector plate 68 has a strip-like region 78. The strip-like region 78 is adapted to the contour of the fuel cell region 70 such that the strip-like region 78 closely follows the contour of the fuel cell region 70. The strip-like region 78 is preferably C-shaped. A retaining eye 80 is arranged at each of the opposite ends of the strip-like region 78.

The fuel cell region 70 comprises a retaining device 81 adapted to the retaining eyes 80, in order to retain the interconnector plate 68. The retaining device 81 has fixing studs 82 for creating a form-fit connection with the retaining eyes 80.

Each fixing stud 82 is arranged on an outer peripheral face of the fuel cell region 70. The fixing stud 82 is preferably configured so as to be substantially hemispherical. The interconnector plates 68 may be attached to the fuel cell region 70 by glass solder. Here, the glass solder may seal any remaining openings.

The fuel cell region 70 furthermore comprises an opening 84 for each contact tongue 71.

Figure 15:
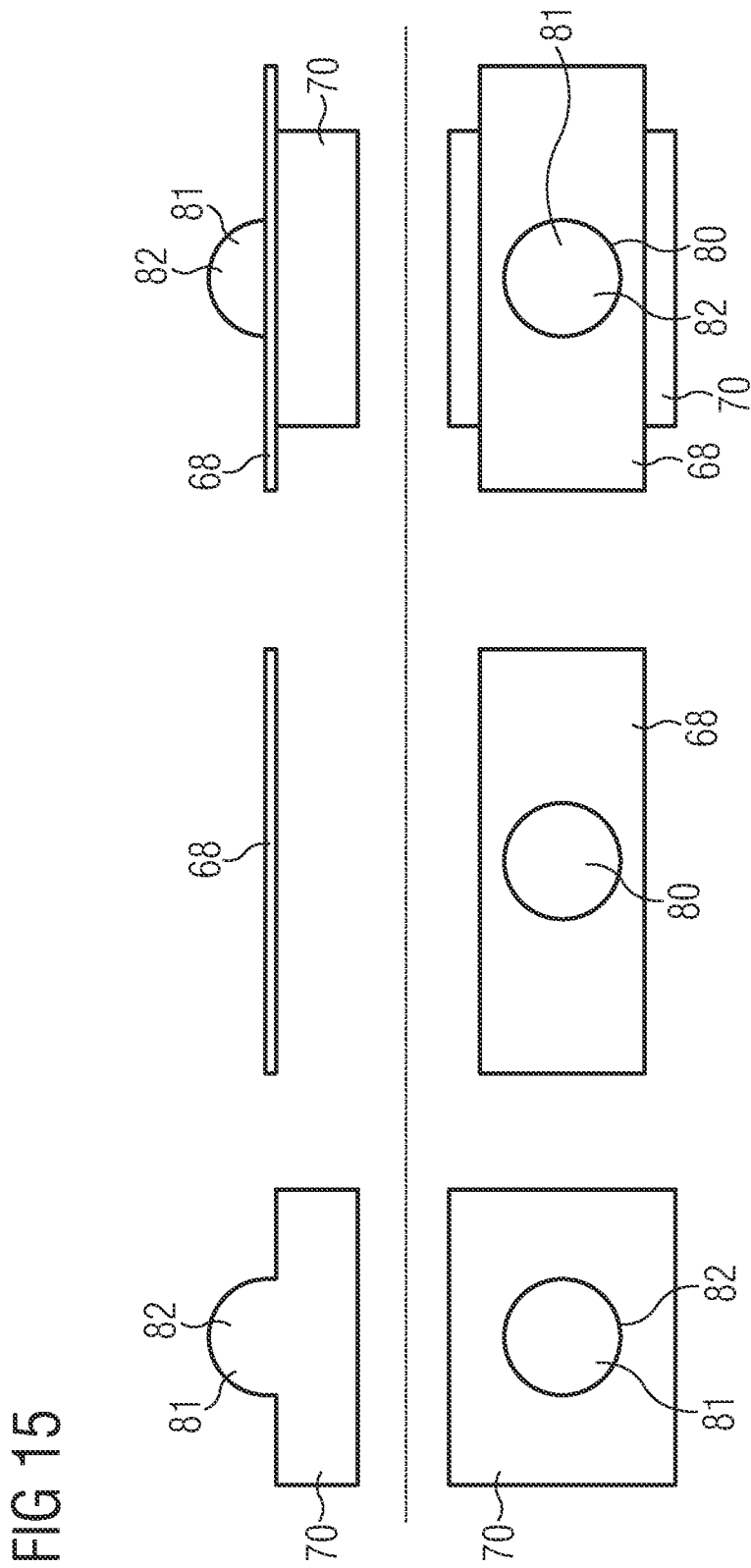
FIG. 15 through FIG. 17 show example embodiments of the fixing of the interconnector plate.
Figure 16:
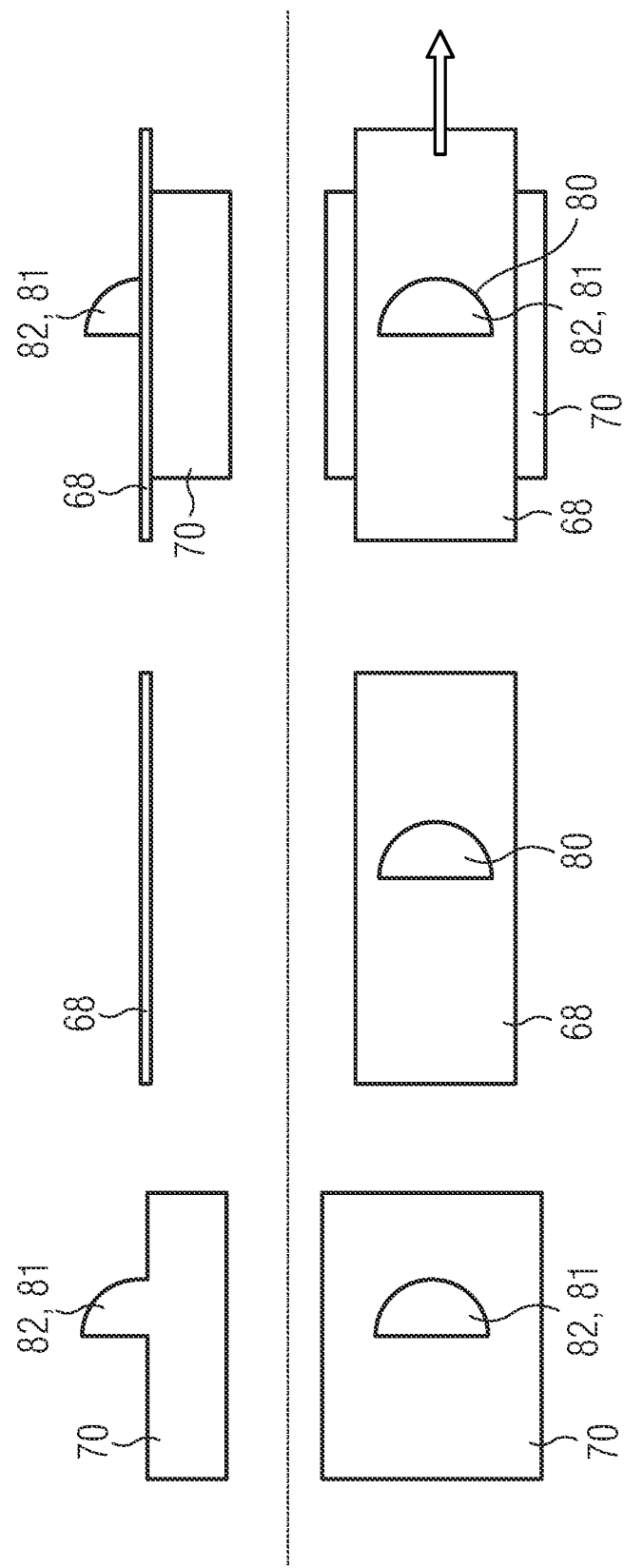
Figure 17:
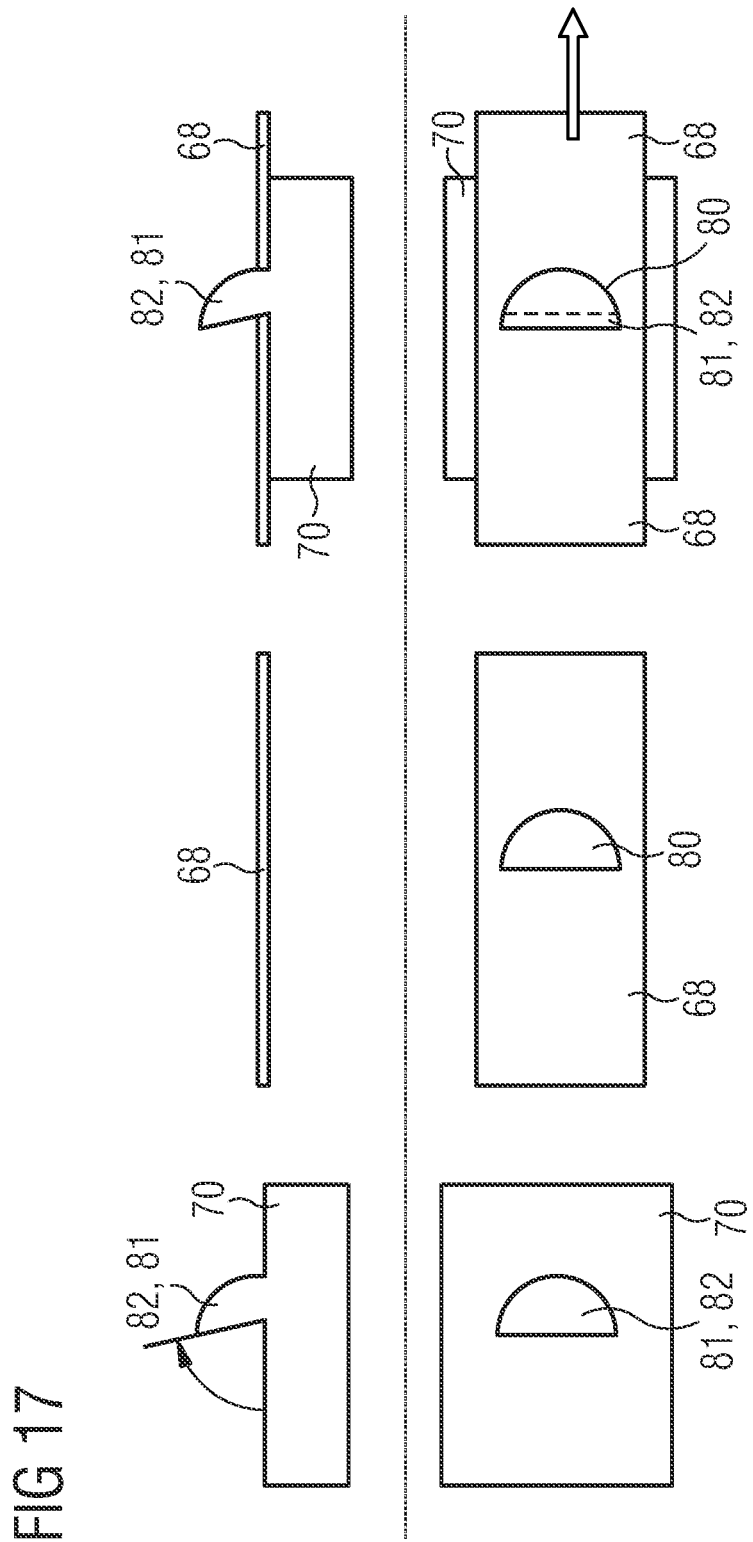

As shown in FIGS. 15 through 17, the retaining eyes 80 and the fixing studs 82 may have different forms. The left-hand part of FIG. 15 shows a hemispherical fixing stud 82 which is associated with a circular retaining eye 80 (FIG. 15, center). The right-hand part of FIG. 15 shows the form-fit connection which prevents the interconnector plate 68 from slipping out of the fuel cell region 70.

A further variant which has a quarter-spherical fixing stud 82 is shown on the left in FIG. 16. This is associated with a D-shaped retaining eye 80 (FIG. 16, center). The steep flank of the fixing stud 82 may better prevent slipping (FIG. 16). It is also possible to hold the interconnector plate 68 under slightly less mechanical stress and thus allow a better contact with the fuel cell region 70.

The form-fit connection may be further improved with the variant shown in FIG. 17. As in FIG. 16, a D-shaped retaining eye 80 is necessary. However, the fixing stud 82 has an acute angle to the horizontal.

Figure 18:
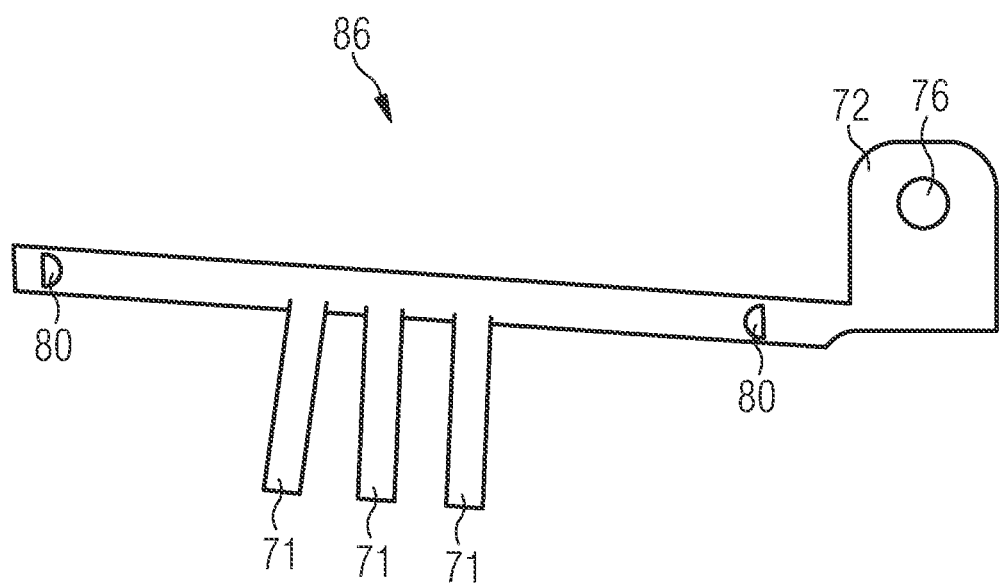
FIG. 18 and FIG. 19 show an example of manufacture of the interconnector plate from FIG. 13.
Figure 19:
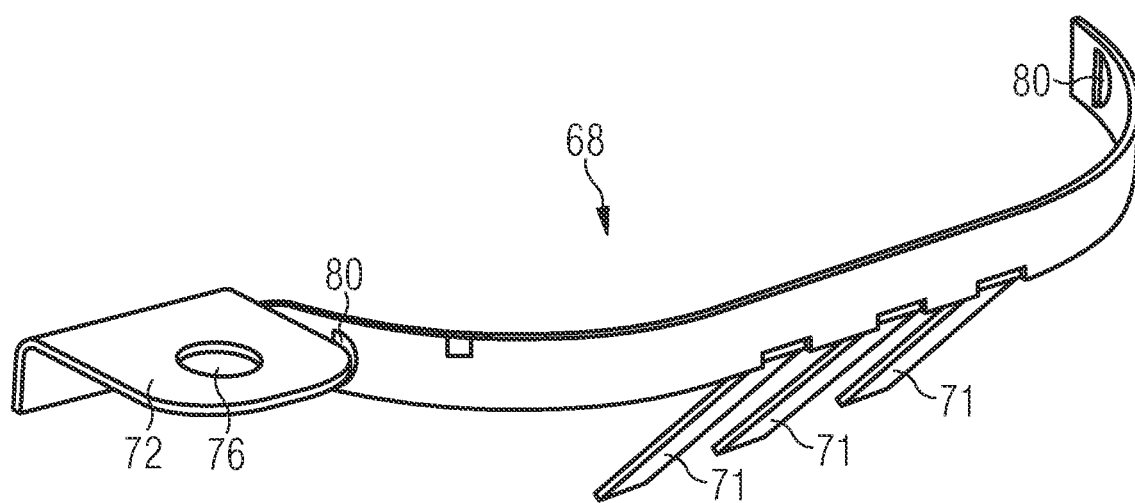

The manufacture of an interconnector plate 68 is explained in more detail below with reference to FIGS. 18 and 19. An interconnector plate blank 86 is cut out of an initially provided flat sheet metal material.

The interconnector plate blank 86 already has a plurality of rectangular contact tongues 71, a connecting region 72, a strip-like region 78 and retaining eyes 80.

The interconnector plate blank 86 is formed into the finished interconnector plate 68 by bending. The strip-like region 78 is here bent such that the interconnector plate 68 can closely follow the contour of the fuel cell region 70. The retaining eyes 80 are bent into the positions corresponding to the fixing studs 82. The contact tongues 71 have an angle α which corresponds to the slope of the gas channels 38, 40 relative to the horizontal direction. Finally, the connecting region 72 may be bent into the horizontal.

Figure 20:
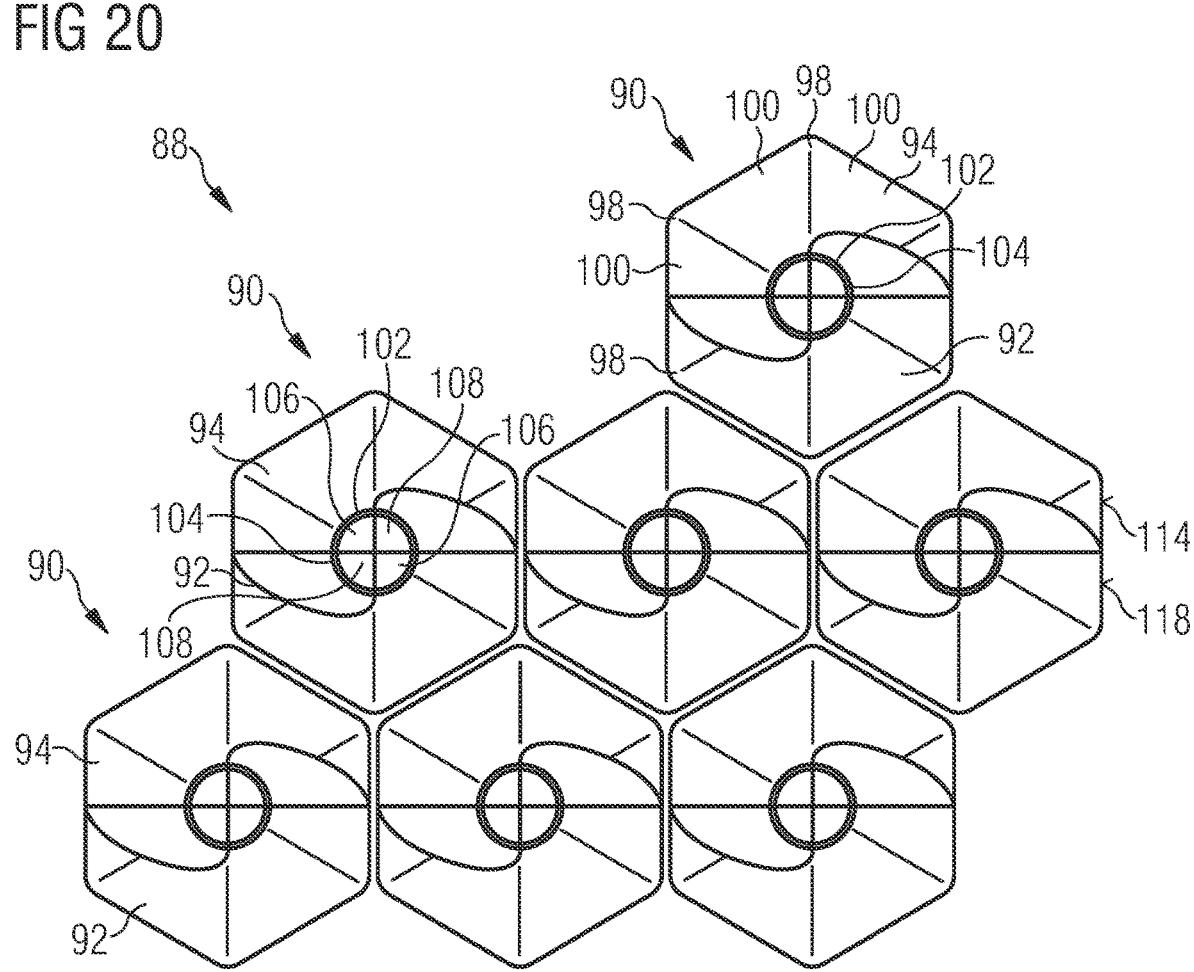
FIG. 20 and FIG. 21 each show an example embodiment of the fuel cell system.
Figure 21:
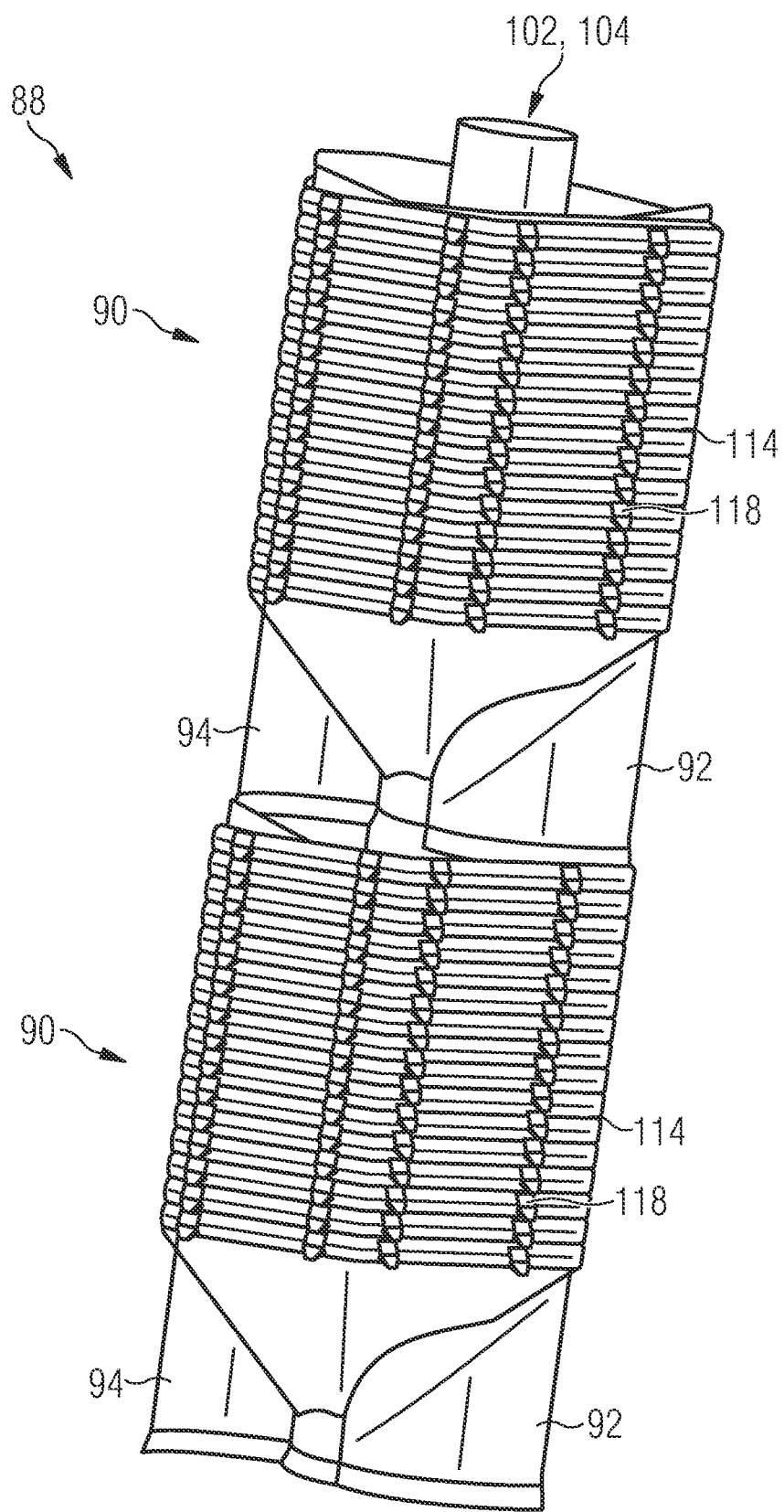

Reference is now made to FIGS. 20 and 21 which each show an example of the fuel cell system 88. The fuel cell system 88 comprises a plurality of fuel cells 90 which are shown in more detail in FIGS. 22 through 24.

The fuel cells 90 have an approximately hexagonal form in top view. The fuel cells 90, as shown in more detail for example in FIG. 20, are arranged in one plane spaced apart from one another. The fuel cells 90 may also be arranged stacked along their structural axis 22, as shown in more detail in FIG. 21. A combination of the arrangements is also possible in which the fuel cells 90 are arranged one above the other in several levels.

Figure 22:
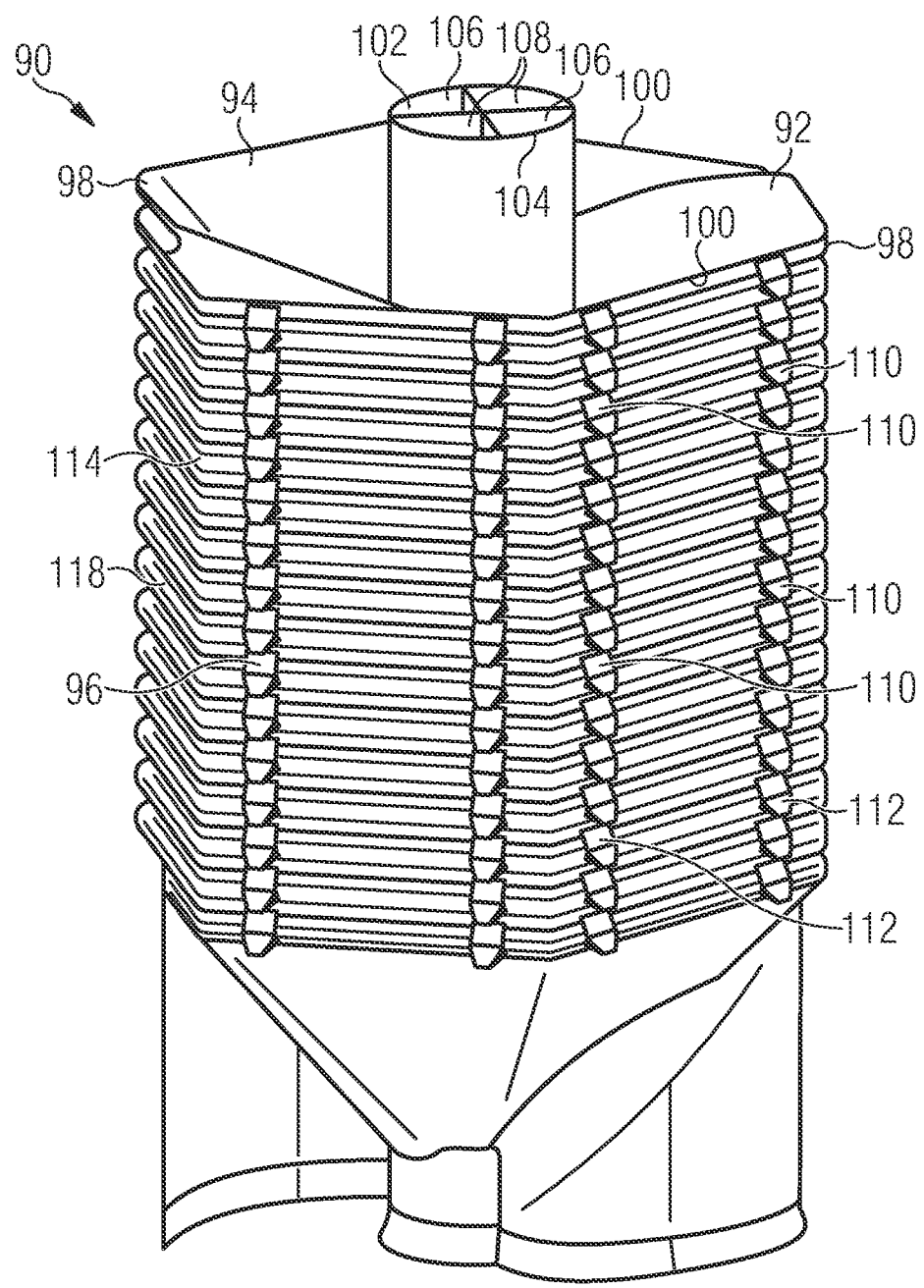
FIG. 22 shows an example embodiment of a fuel cell.
Figure 23:
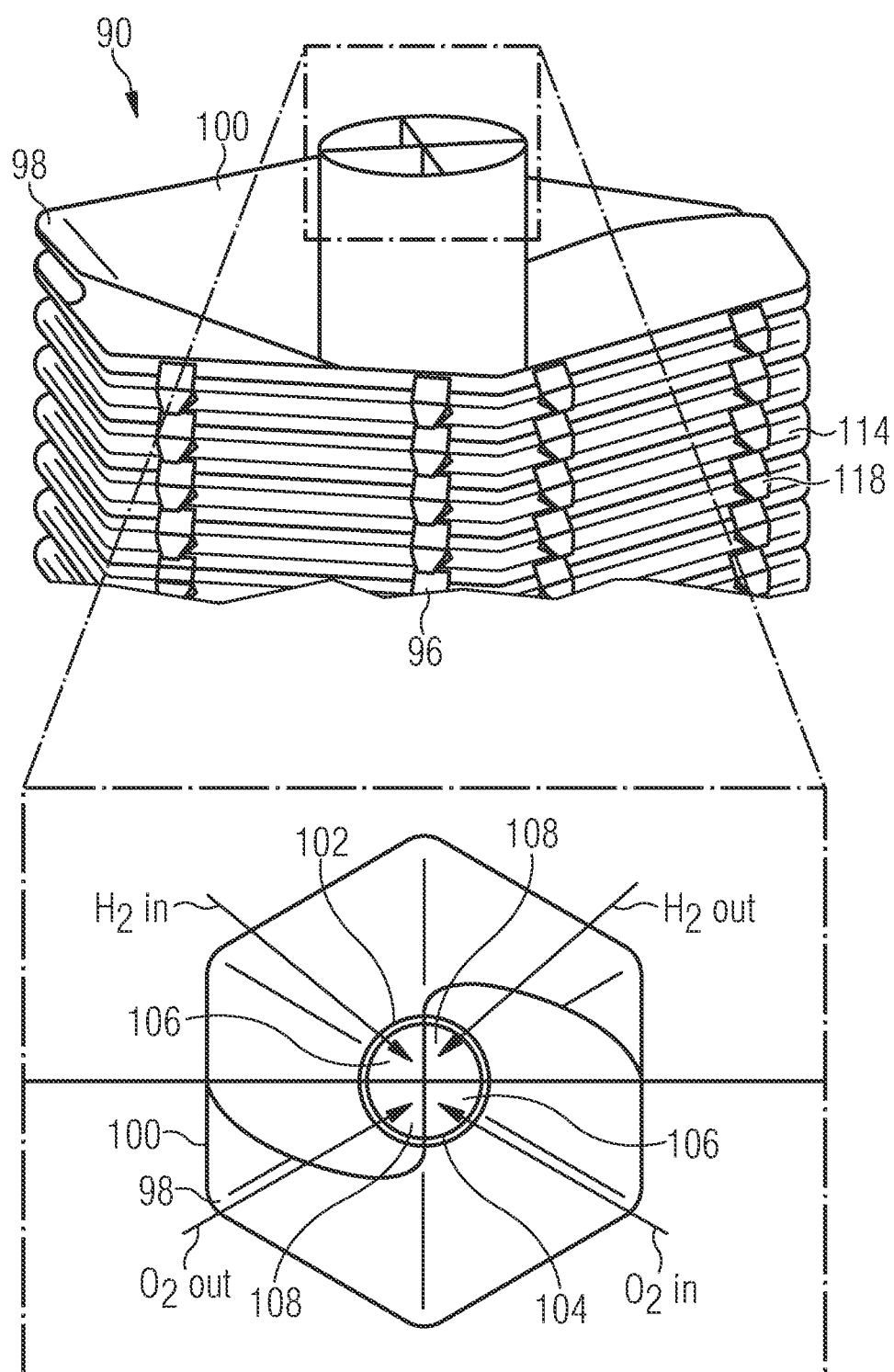
FIG. 23 shows a schematic illustration of the supply and discharge of gas in the fuel cell from FIG. 22.
Figure 24:
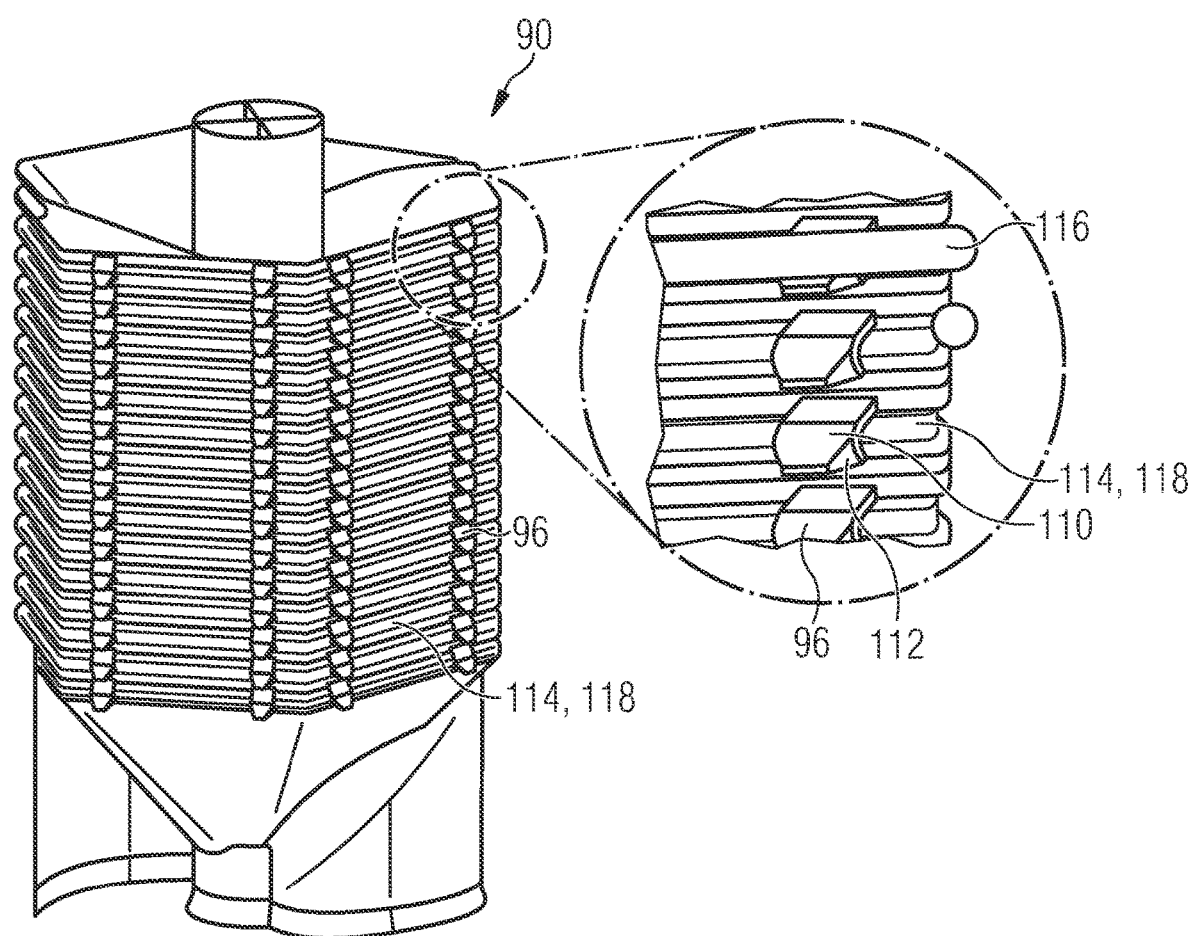
FIG. 24 shows a detail view of a wiring of a fuel cell from FIG. 22.
Figure 25:
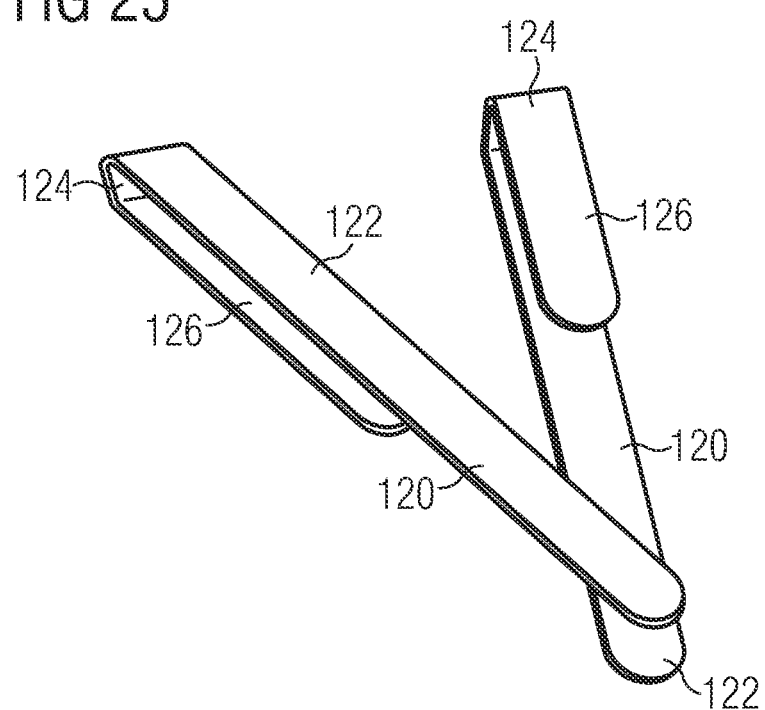
FIG. 25 shows an example embodiment of an interconnector plate.

An example of the fuel cell 90 will now be explained in more detail with reference to FIGS. 22 through 24.

The fuel cell 90 has a first fuel cell region 92 and a second fuel cell region 94. Each fuel cell region 92, 94 contains a gas channel. In the present case, the first fuel cell region 92 and the second fuel cell region 94 are configured integrally as a single one-piece element.

The first fuel cell region 92 comprises a first gas channel, for example for oxidator, and the second fuel cell region 94 comprises a second gas channel, for example for fuel.

The first gas channel and the second gas channel extend in the form of a double helix in a peripheral direction around the structural axis 22. The structural axis 22 runs in the center of the fuel cell 90.

The first gas channel and the second gas channel are preferably connected together along their extension direction by an ion-conductive separating layer. Furthermore, an isolating layer may be arranged to prevent cell conclusion.

Each gas channel may contain an electrode coating 96 for extracting the electrical energy generated in the fuel cell 90.

Each gas channel has a plurality of gas channel curvature regions 98 and adjacent gas channel planar regions 100. Each gas channel curvature region 98 is preferably curved through 120°. Each gas channel planar region 100 is straight and has no curvature.

As a whole, in top view, the fuel cell regions 92, 94 have a substantially hexagonal form.

The fuel cell 90 comprises a first distribution pipe 102 and a second distribution pipe 104. The first distribution pipe 102 may be provided for the fuel, while the second distribution pipe 104 may be provided for the oxidator.

The distribution pipes 102, 104 are arranged in a region which is surrounded by the gas channels, or enclosed when viewed in top view. The distribution pipes 102, 104 are preferably arranged in the center of the fuel cell 90 when viewed in top view. The distribution pipes 102, 104 in the present case run parallel to the structural axis 22.

Each distribution pipe 102, 104 has a gas supply region 106 which may be configured so as to be connectable to a gas reservoir. In the case of the oxidator, the gas supply region 106 may serve as an air supply without a gas reservoir.

Each distribution pipe 102, 104 also has a gas discharge region 108 from which unused residual gas and reaction product may escape.

The first distribution pipe 102 may for example be provided for distribution of fuel and form a continuous fluid path together with the first gas channel. In other words, the gas supply region 106 of the first distribution pipe 102 is fluidically connected via the first gas channel to the gas discharge region 108 of the first distribution pipe 102.

The second distribution pipe 104 may serve for distribution of oxidator and form a continuous fluid path together with the second gas channel. In other words, the gas supply region 106 of the second distribution pipe 104 is fluidically connected via the second gas channel to the gas discharge region 108 of the second distribution pipe 104.

The fuel cell 90 may be divided into several part portions which can be supplied with fuel and oxidator through the distribution pipes 102, 104, independently of the other part portions.

The fuel cell 90 also comprises a plurality of openings 110 for interconnector plates. The openings 110 are preferably arranged on the gas channel planar regions 100. The openings 110 may be arranged at the respective ends of the gas channel planar region 100 next to the gas channel curvature regions 98.

The fuel cell 90 comprises a retaining device 112 for interconnector plates. The retaining device 112 is arranged close to or in the openings 110.

The fuel cell 90 also comprises a winding structure 114 for a conductive element 116, for example a wire. The winding structure 114 is provided on the peripheral outer face of the fuel cell 90. The winding structure 114 is configured in helical form. The winding structure 114 preferably comprises a groove 118 which runs such that interconnector plates of the same polarity can be connected together electrically by winding the conductive element 116 around the winding structure 114.

Furthermore, the conductive element 116 may have an isolation which prevents the conductive element 116 from causing a short circuit. The conductive element 116 may also contain several wires which are each assigned to an interconnector polarity and can only come into contact therewith.

The fuel cell 90 furthermore comprises a plurality of interconnector plates 120.

Each interconnector plate 120 comprises a single contact tongue 122. The contact tongue 122 protrudes into the first gas channel or into the second gas channel. The contact tongues 122 are each attached to the wall of the respective gas channel. The electrode coating 96 is preferably arranged such that the contact tongues 122 are embedded in the electrode coating 96.

Each interconnector plate 120 furthermore comprises an electrical connecting region 124 which adjoins the contact tongue 122. The connecting region 124 is configured such that in the installed state of the interconnector plate 120, it is facing radially outward and can be received by a conductive element 116.

Each interconnector plate 120 has a clamping region 126. The clamping region 126 extends substantially parallel to and at a distance from the contact tongue 122. The interconnector plate 120 may thus be inserted in the opening 110 and retained on the fuel cell 90.

Figure 26:
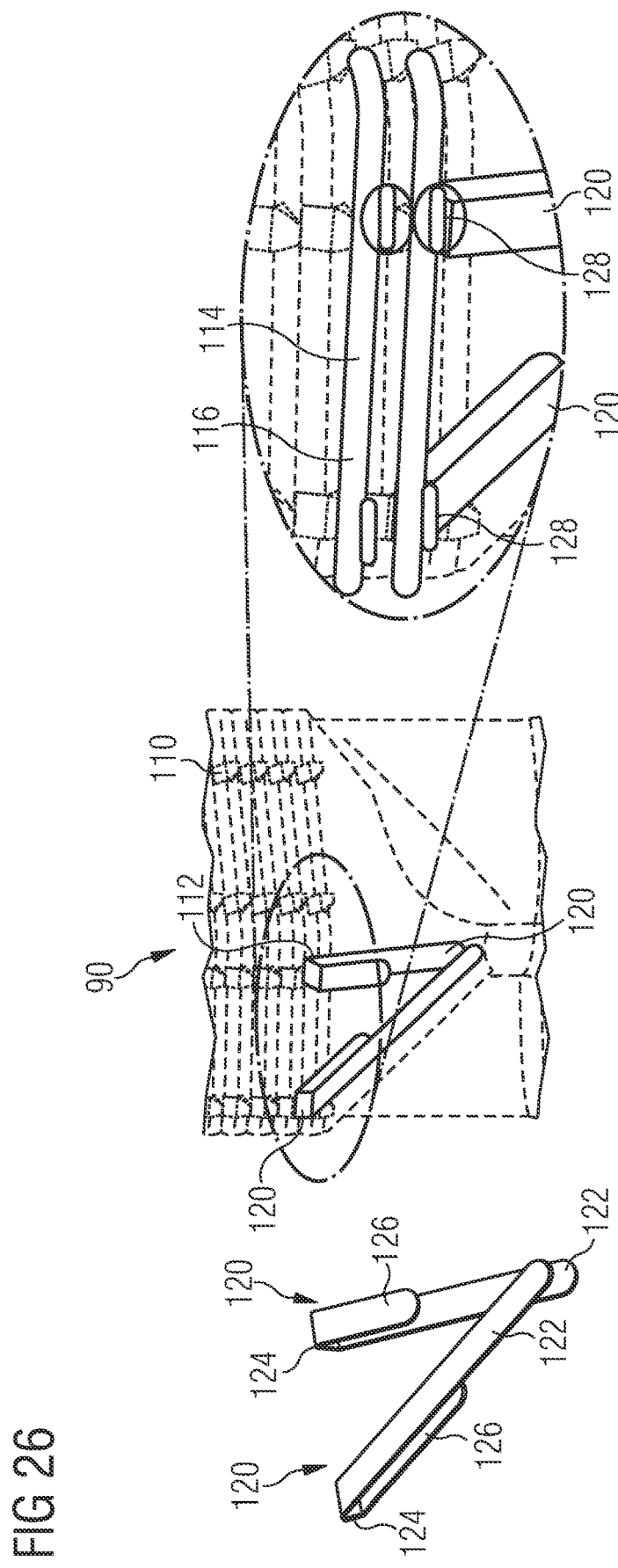
FIG. 26 shows an example of a wiring process of the fuel cell.

Reference is now made to FIG. 26. The fuel cell 90 may be electrically connected as shown, in that firstly the interconnector plates 120 are inserted in the openings 110. Then the conductive element 116 is wound around the peripheral outer face of the fuel cell 90 using the winding structure 114. The conductive element 116 thus comes into contact with the interconnector plates 120, more precisely with the electrical connecting region 124. Any remaining openings may be sealed by glass solder 128. The glass solder may simultaneously serve for securing the interconnector plates 120.

To provide a higher power density, a fuel cell 66 is proposed. The fuel cell 66 may be produced in ceramic by 3-D printing and has an improved power density because of its helical shape. For better extraction of the energy generated by the fuel cell 66, an interconnector plate 68 is proposed which can be attached by form fit to fixing studs 82 of the fuel cell 66 by retaining eyes 80. In addition, the interconnector plate 68 may be secured by glass solder.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 Fuel cell
12 First fuel cell region
14 Second fuel cell region
16 Gas channel
18 First gas channel
20 Second gas channel
22 Structural axis
24 Ion-conductive separating layer
26 Isolating layer
28 Electrode coating
30 Fuel cell
32 Fuel cell region
34 First fuel cell region
36 Second fuel cell region
38 First gas channel
40 Second gas channel
42 Structural axis
44 Gas channel curvature region
46 Gas channel planar region
48 Gas inlet region
50 Gas outlet region
52 Electrode coating
54 Fuel cell
56 First distribution pipe
58 Second distribution pipe
60 Gas supply region
62 Gas discharge region
64 Part portion
66 Fuel cell
68 Interconnector plate
70 Fuel cell region
71 Contact tongue
72 Connecting region
74 Connection axis
76 Connecting opening
78 Strip-like region
80 Retaining eye
81 Retaining device
82 Fixing stud
84 Opening
86 Interconnector plate blank
88 Fuel cell system
90 Fuel cell
92 First fuel cell region
94 Second fuel cell region
96 Electrode coating
98 Gas channel curvature region
100 Gas channel planar region
102 First distribution pipe
104 Second distribution pipe
106 Gas supply region
108 Gas discharge region
110 Opening
112 Retaining device
114 Winding structure
116 Conductive element
118 Groove
120 Interconnector plate
122 Contact tongue
124 Electrical connecting region
126 Clamping region
128 Glass solder

The invention claimed is:

1. An interconnector plate for a fuel cell, the interconnector plate comprising:
a strip-like region, which, in an installed state, follows a contour of a fuel cell segment;
a connecting region, which is at an end of the strip-like region and is configured for extracting electrical energy from the interconnector plate;
at least one retaining eye, which is formed in the strip-like region and by which the interconnector plate can be retained by a form fit engagement with the fuel cell segment by attachment to a retaining device of the fuel cell segment; and
at least one contact tongue, which extends from the strip-like region to be insertable within a gas channel of the fuel cell segment.

2. The interconnector plate of claim 1, wherein the interconnector plate is configured as a bent sheet metal part.

3. The interconnector plate of claim 1, wherein the at least one tongue contact is a plurality of contact tongues, which are arranged in a comb-like fashion, such that each of the plurality of contact tongues is insertable within the gas channel of the fuel cell segment.

4. The interconnector plate of claim 1, wherein the interconnector plate has a same expansion coefficient as an expansion coefficient of the gas channel in which it is insertable to prevent delamination of the interconnector plate and the at least one contact tongue.

5. The interconnector plate of claim 1, wherein the at least one retaining eye is a first retaining eye and a second retaining eye, the at least one contact tongue being arranged, along the strip-like section, between the first retaining eye and the second retaining eye.

6. The interconnector plate of claim 1, wherein the at least one retaining eye has a circular or D-shaped form.

7. The interconnector plate of claim 1, wherein the at least one contact tongue extends from the strip-like region such that a direction of insertion of the at least one contact tongue within the gas channel of the fuel cell segment is radially inward.

8. A fuel cell segment for forming a fuel cell, the fuel cell segment comprising:
a gas channel;
at least one fixing stud; and
the interconnector plate of claim 1;
wherein the at least one fixing stud engages with the at least one retaining eye to retain the interconnector plate on the fuel cell segment by a form fit engagement therewith.

9. The fuel cell segment of claim 8, wherein the at least one fixing stud is configured as a hemisphere, a quarter sphere, or a hook.

10. The fuel cell segment of claim 8, wherein the fuel cell segment comprises, at an edge of the gas channel, a contact face for the strip-like region of the interconnector plate, so that the strip-like region, in an installed state, follows a contour of the fuel cell segment.

11. A fuel cell or a solid oxide fuel cell for a fuel cell system or for an aircraft, the fuel cell comprising:
a plurality of fuel cell segments for forming the fuel cell, each of the plurality of fuel cell segments comprising:
a gas channel;
at least one fixing stud; and
the interconnector plate of claim 1;

wherein the at least one fixing stud engages with the at least one retaining eye to retain the interconnector plate on the fuel cell segment by a form fit engagement therewith; and wherein the plurality of fuel cell segments are stacked one on top of another to form the fuel cell or the solid oxide fuel cell.

12. An aircraft comprising the fuel cell or the solid oxide fuel cell of claim 11.

13. A method for manufacturing an interconnector plate for a fuel cell segment, the method comprising:
providing a flat metal sheet;
cutting out a flat interconnector plate blank;
forming, from the flat interconnector plate blank, the interconnector plate, which comprises:
a strip-like region, which, in an installed state, follows a contour of the fuel cell segment;
at connecting region, which is at an end of the strip-like region and is configured for extracting electrical energy from the interconnector plate;
at least one retaining eye, which is formed in the strip-like region and by which the interconnector plate can be retained by a form fit engagement with the fuel cell segment by attachment to a retaining device of the fuel cell segment; and
at least one contact tongue, which extends from the strip-like region to be insertable within a gas channel of the fuel cell segment; and
bending the interconnector plate blank into a three-dimensional form, which corresponds to the contour of the fuel cell segment such that, in the installed state, the interconnector plate follows the contour of the fuel cell segment.

14. A method of manufacturing a fuel cell, the method comprising:
providing a plurality of fuel cell segments, each of which comprises a gas channel delimited by a gas channel wall;
stacking the plurality of fuel cell segments one on top of another;
forming a plurality of interconnector plates by:
providing a flat metal sheet;
cutting out a flat interconnector plate blank;
forming, from the flat interconnector plate blank, the interconnector plate, which comprises:
a strip-like region, which, in an installed state, follows a contour of the fuel cell segment
a connecting region, which is at an end of the strip-like region and is configured for extracting electrical energy from the interconnector plate;
at least one retaining eye, which is formed in the strip-like region and by which the interconnector plate can be retained by a form fit engagement with the fuel cell segment by attachment to a retaining device of the fuel cell segment; and
at least one contact tongue, which extends from the strip-like region to be insertable within a gas channel of the fuel cell segment; and
bending the interconnector plate blank into a three-dimensional form, which corresponds to the contour of the fuel cell segment such that, in the installed state, the interconnector plate follows the contour of the fuel cell segment;
inserting the at least one contact tongue of each of the plurality of interconnector plates within a gas channel of a corresponding one of the plurality of fuel cell segments; and
attaching each of the plurality of the interconnector plates to the gas channel wall of the corresponding one of the plurality of fuel cell segments.

15. The method of claim 14, comprising subsequently coating the gas channel wall of each of the plurality of fuel cell segments with an electrode coating so that each of the plurality of interconnector plates is embedded in the electrode coating.

16. The fuel cell segment of claim 8, wherein the interconnector plate is configured as a bent sheet metal part.

17. The fuel cell segment of claim 8, wherein the at least one tongue contact is a plurality of contact tongues, which are arranged in a comb-like fashion, such that each of the plurality of contact tongues is insertable within the gas channel of the fuel cell segment.

18. The fuel cell segment of claim 8, wherein the interconnector plate has a same expansion coefficient as an expansion coefficient of the gas channel in which it is insertable to prevent delamination of the interconnector plate and the at least one contact tongue.

19. The fuel cell segment of claim 8, wherein the at least one retaining eye is a first retaining eye and a second retaining eye, the at least one contact tongue being arranged, along the strip-like section, between the first retaining eye and the second retaining eye.

20. The fuel cell segment of claim 8, wherein the at least one contact tongue extends from the strip-like region such that a direction of insertion of the at least one contact tongue within the gas channel of the fuel cell segment is radially inward.

* * * * *